(12) United States Patent
Nanba

(10) Patent No.: US 8,873,169 B2
(45) Date of Patent: Oct. 28, 2014

(54) ZOOM LENS AND IMAGE PICKUP APPARATUS USING THE SAME

(71) Applicant: Canon Kabushiki Kaisha, Tokyo (JP)

(72) Inventor: Norihiro Nanba, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 13/795,577

(22) Filed: Mar. 12, 2013

(65) Prior Publication Data

US 2013/0242408 A1  Sep. 19, 2013

(30) Foreign Application Priority Data

Mar. 13, 2012  (JP) ................................. 2012-055741

(51) Int. Cl.
*G02B 9/60* (2006.01)
*G02B 15/173* (2006.01)
*G02B 13/00* (2006.01)

(52) U.S. Cl.
CPC ............ *G02B 13/001* (2013.01); *G02B 15/173* (2013.01)
USPC ....................................................... 359/766

(58) Field of Classification Search
CPC .................................. G02B 9/60; G02B 9/00
USPC .......................................................... 359/766
See application file for complete search history.

(56) References Cited

U.S. PATENT DOCUMENTS 6,025,962 A * 2/2000 Suzuki ......................... 359/766
7,450,314 B2   11/2008 Satori et al.

FOREIGN PATENT DOCUMENTS

JP   1241513 A   9/1989

* cited by examiner

*Primary Examiner* — Joseph P Martinez
(74) *Attorney, Agent, or Firm* — Canon USA Inc. IP Division

(57) ABSTRACT

A zoom lens includes first to fifth lens units arranged sequentially from object to image sides and having respective refractive powers. Compared to a wide-angle end, at a telephoto end, the distance between the first and second lens units, the distance between the third and fourth lens units, and the distance between the fourth and fifth lens units are increased, and the distance between the second and third lens units is decreased. Compared to the wide-angle end, at the telephoto end, the first lens unit is positioned closer to the object side. The first and second lens units each consist of a positive lens element and a negative lens element. The distances between the third and fourth lens units at the wide-angle and telephoto ends D34w and D34t and the focal length of the entire zoom lens at the wide-angle end fw are appropriately set.

15 Claims, 21 Drawing Sheets

WIDE-ANGLE END

MIDDLE

TELEPHOTO END

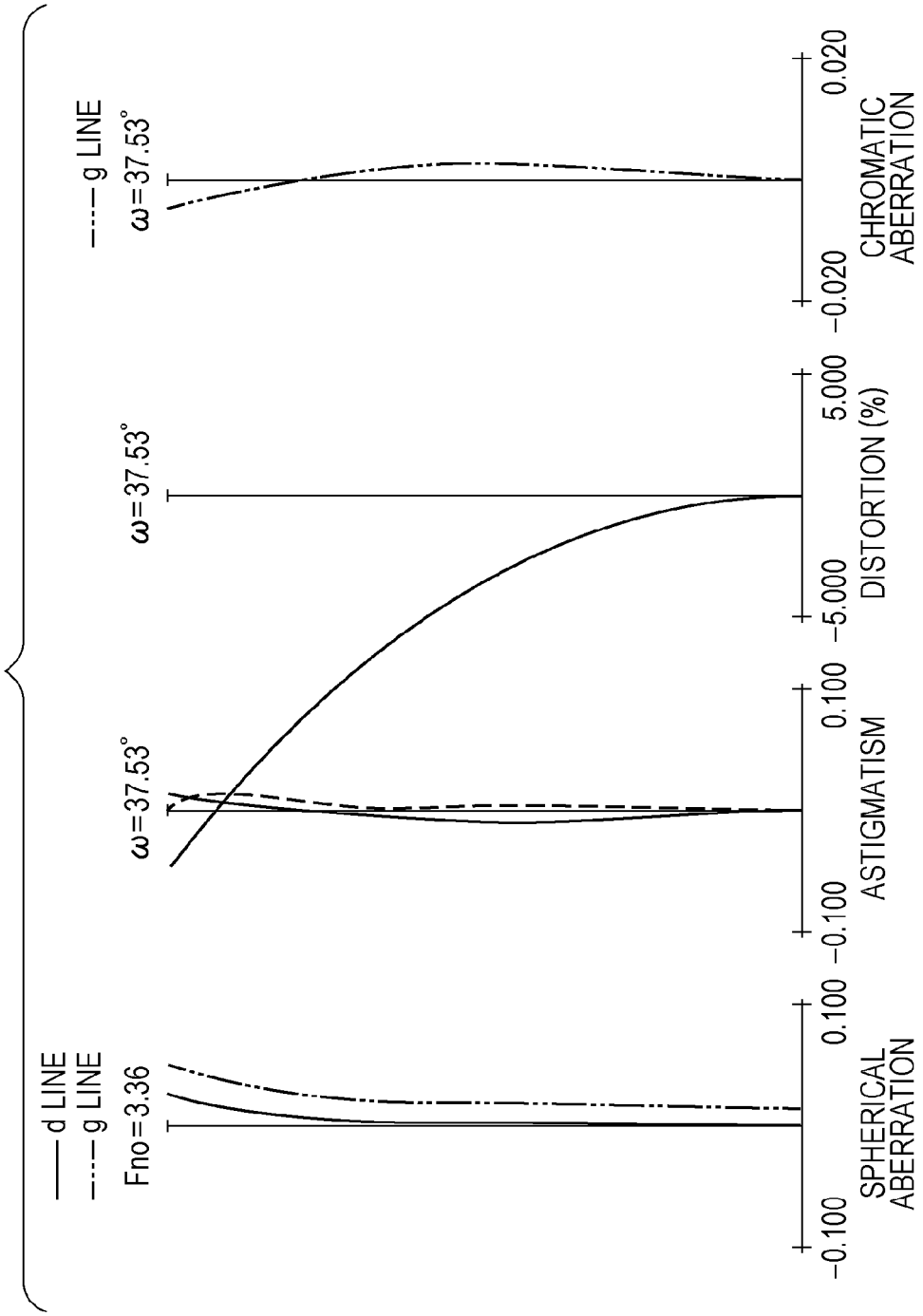

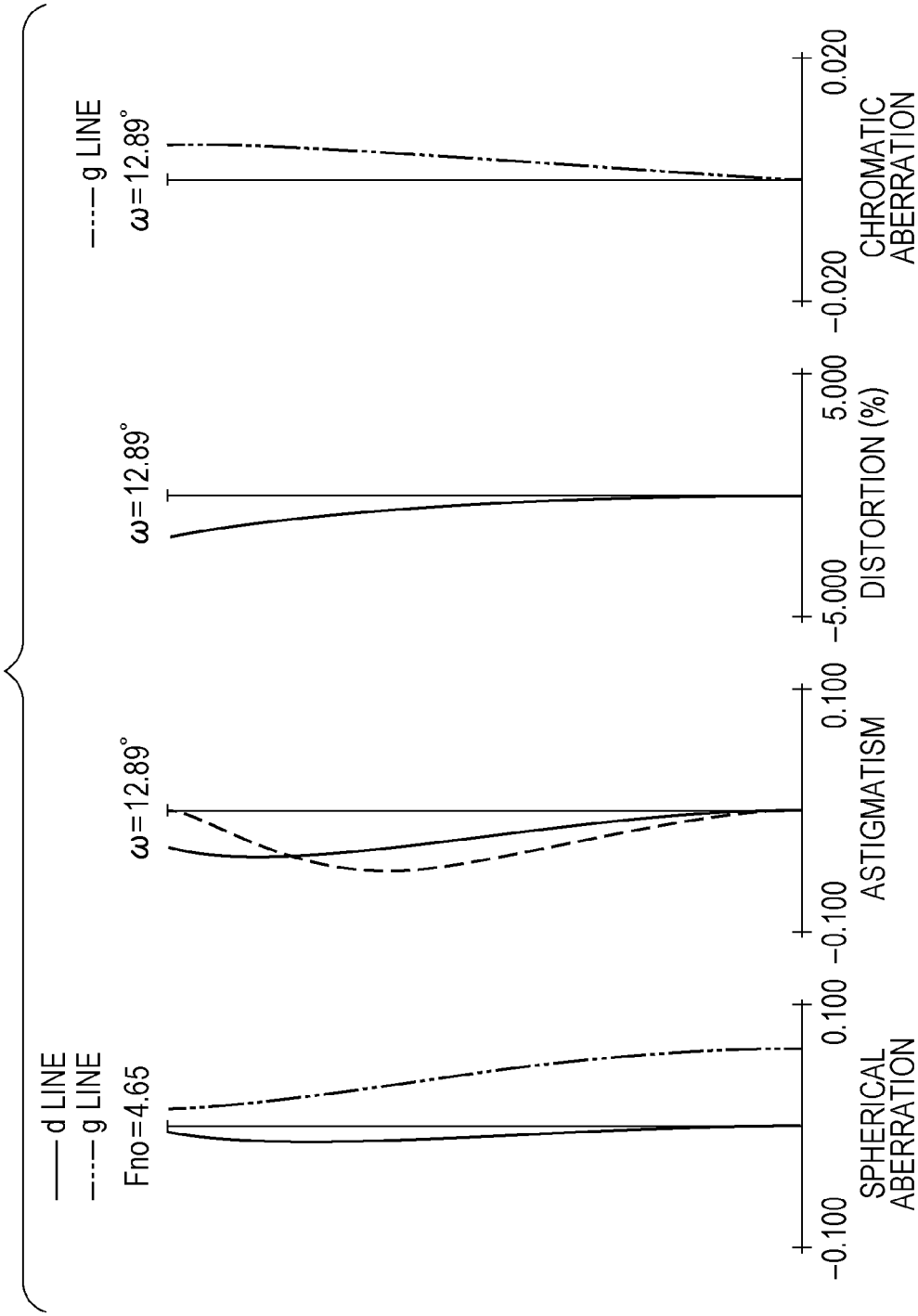

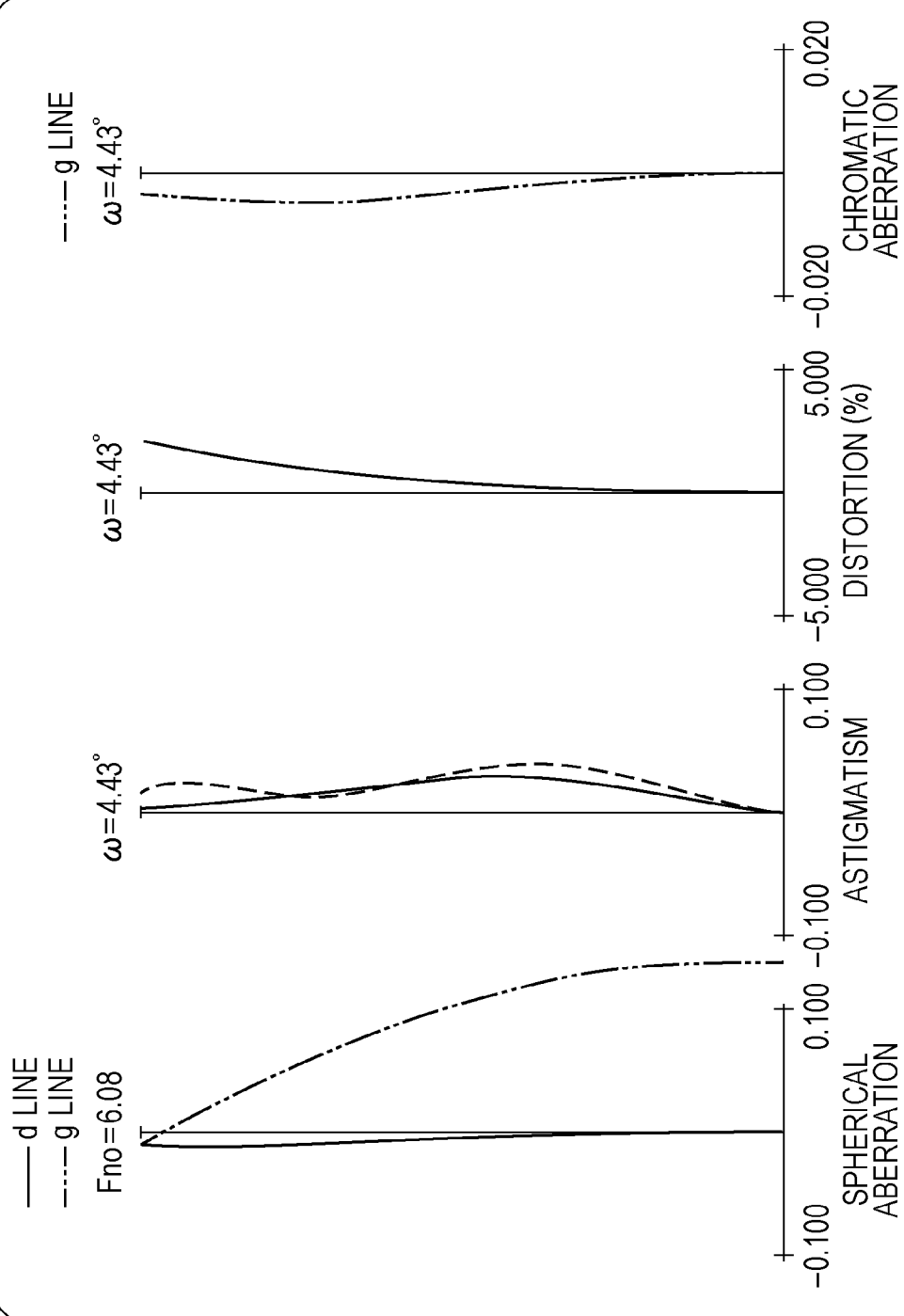

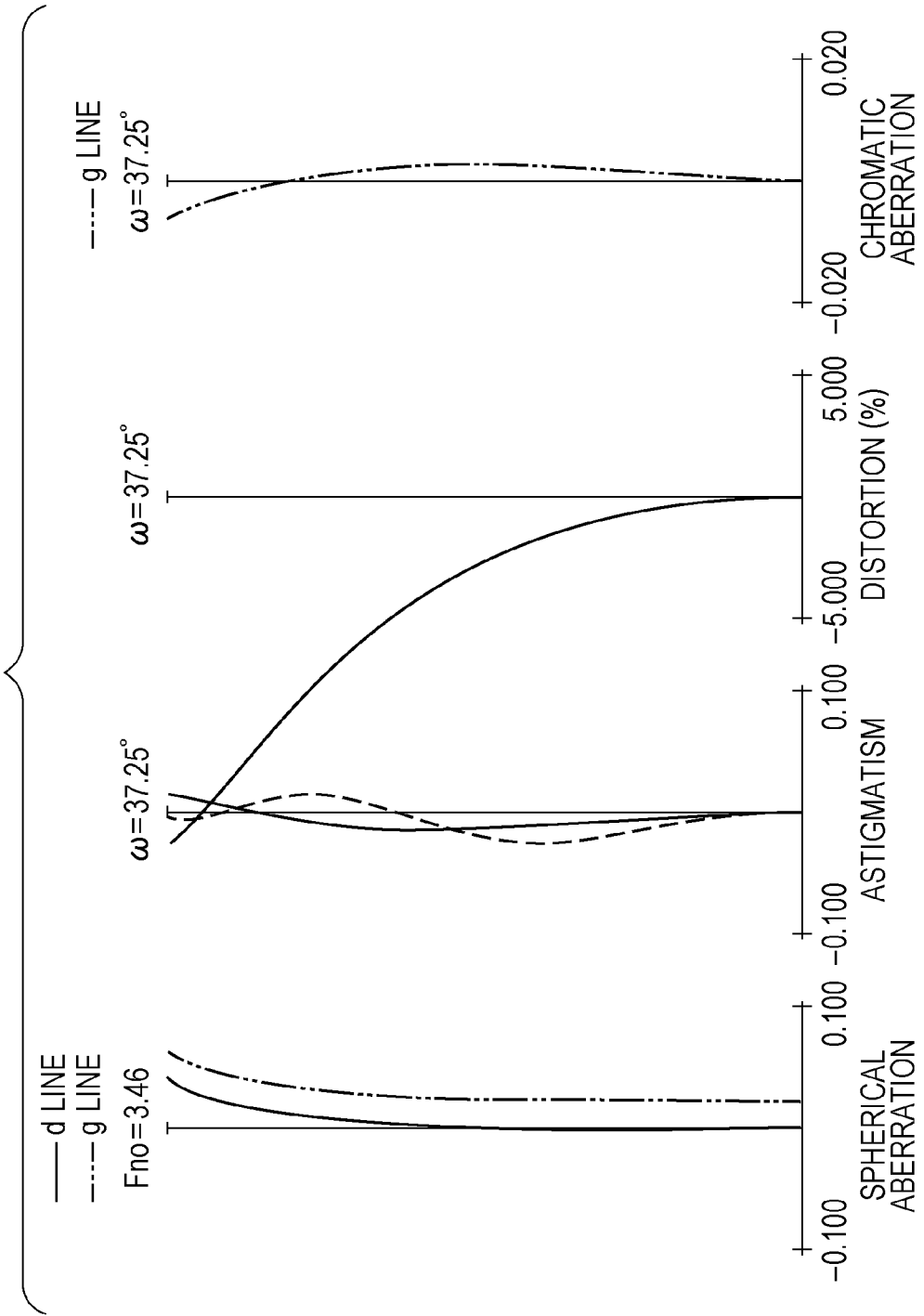

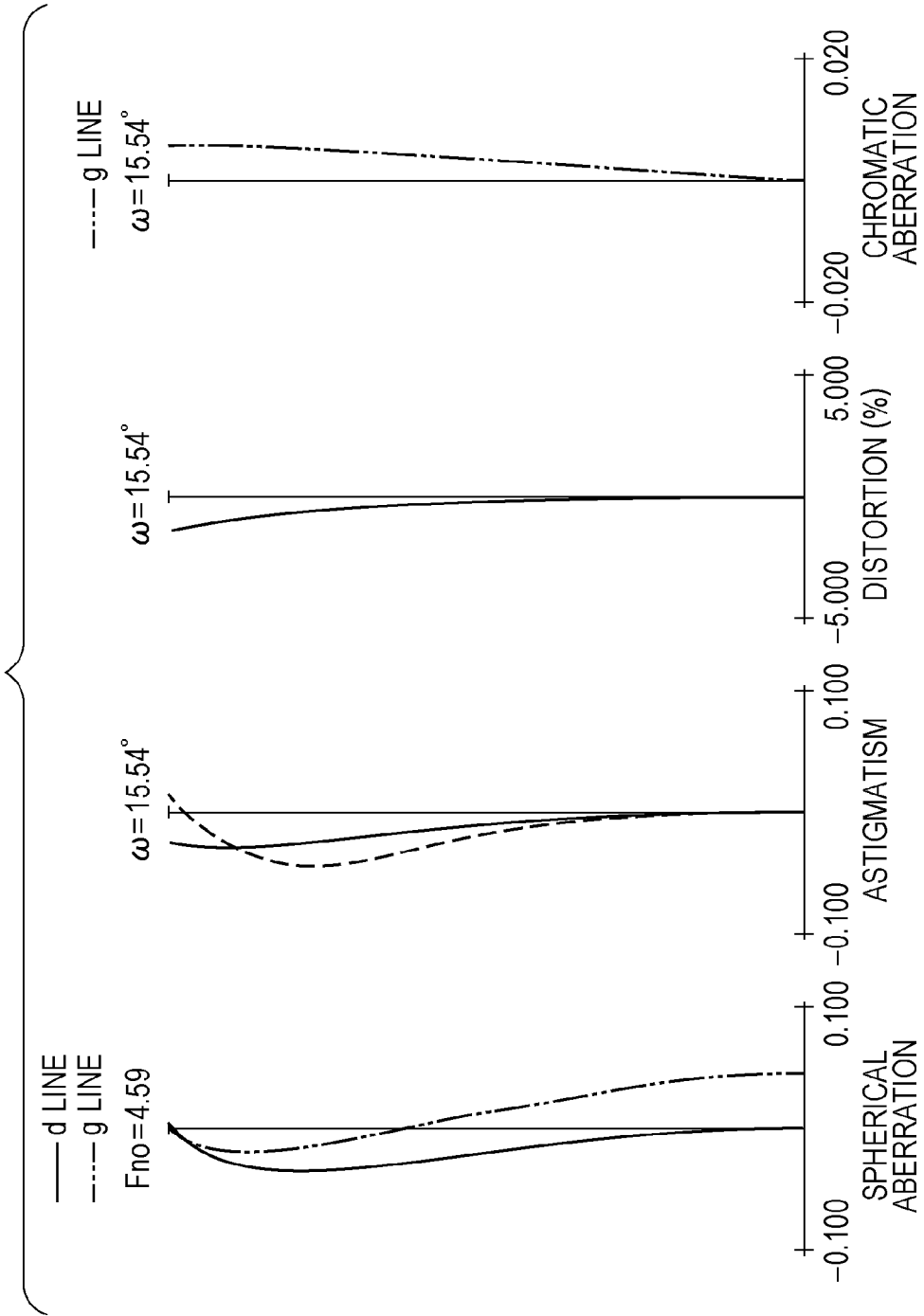

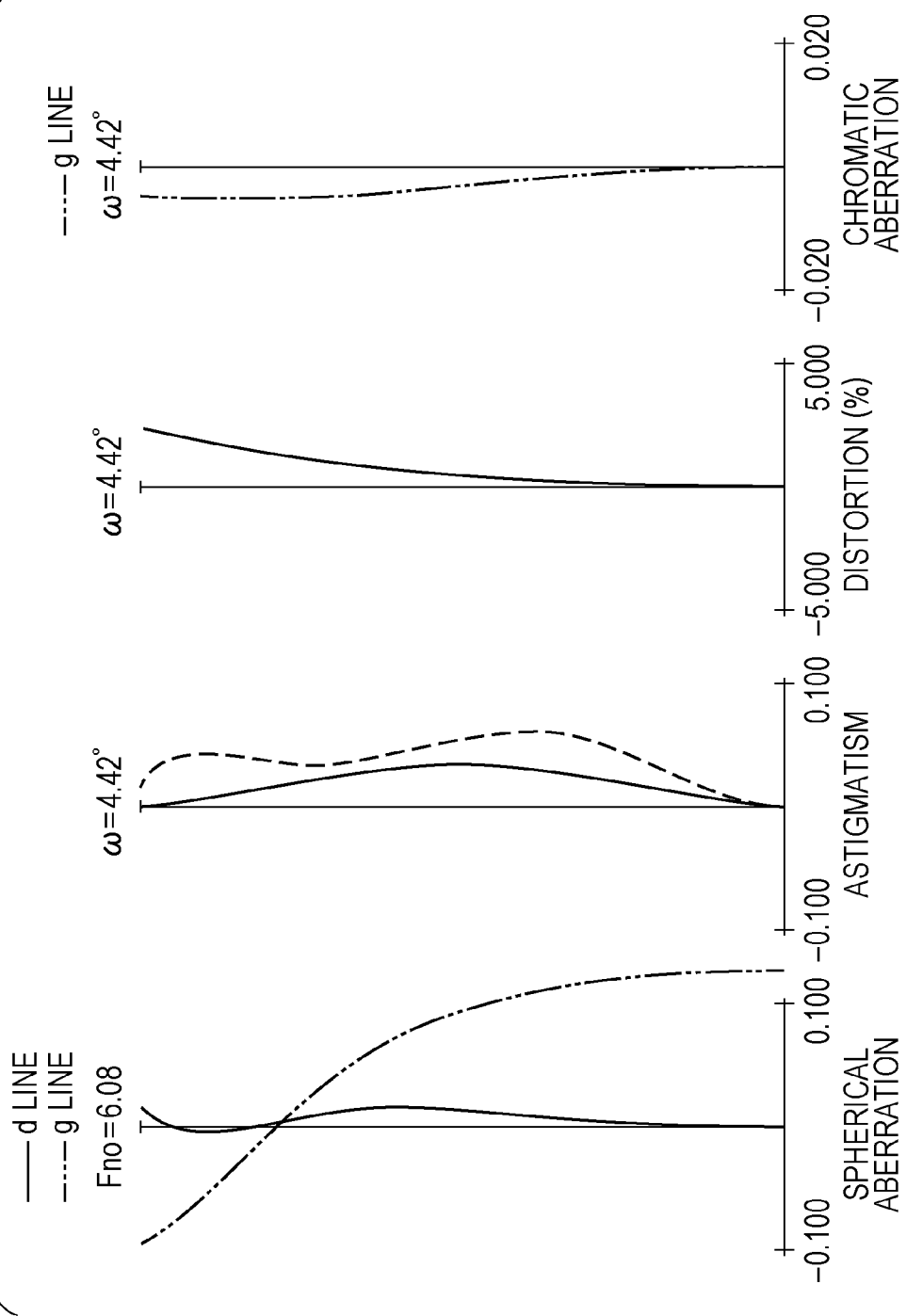

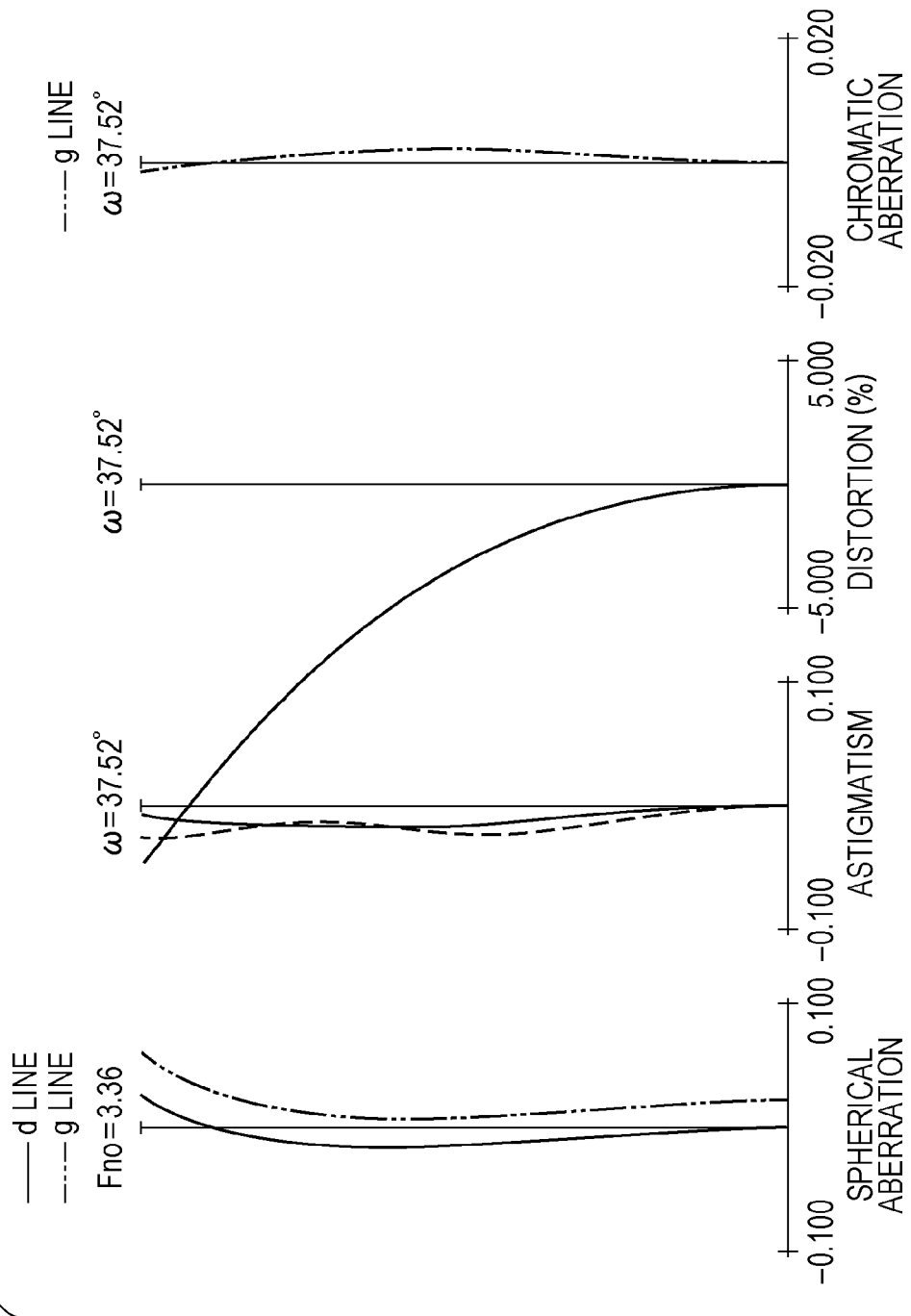

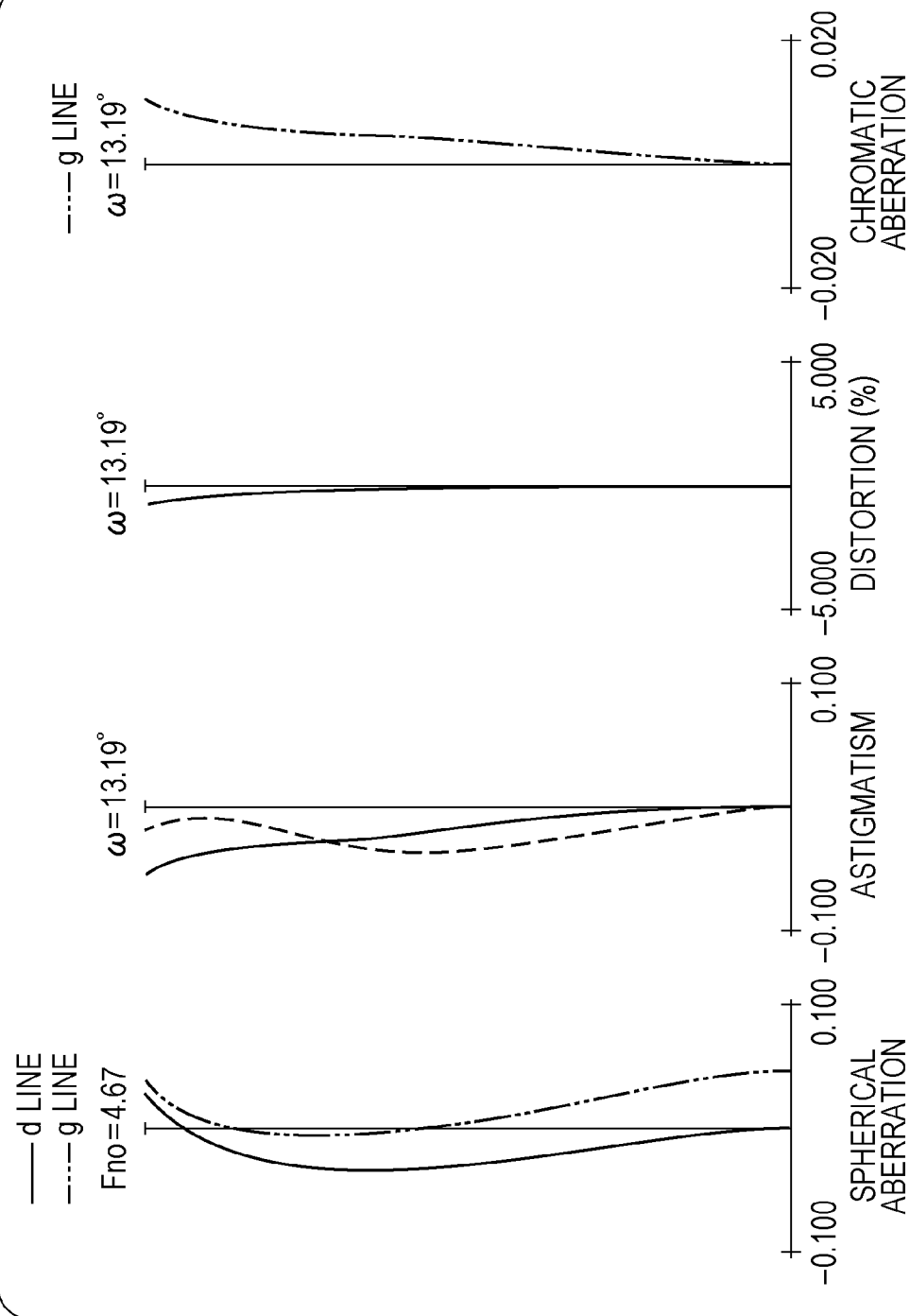

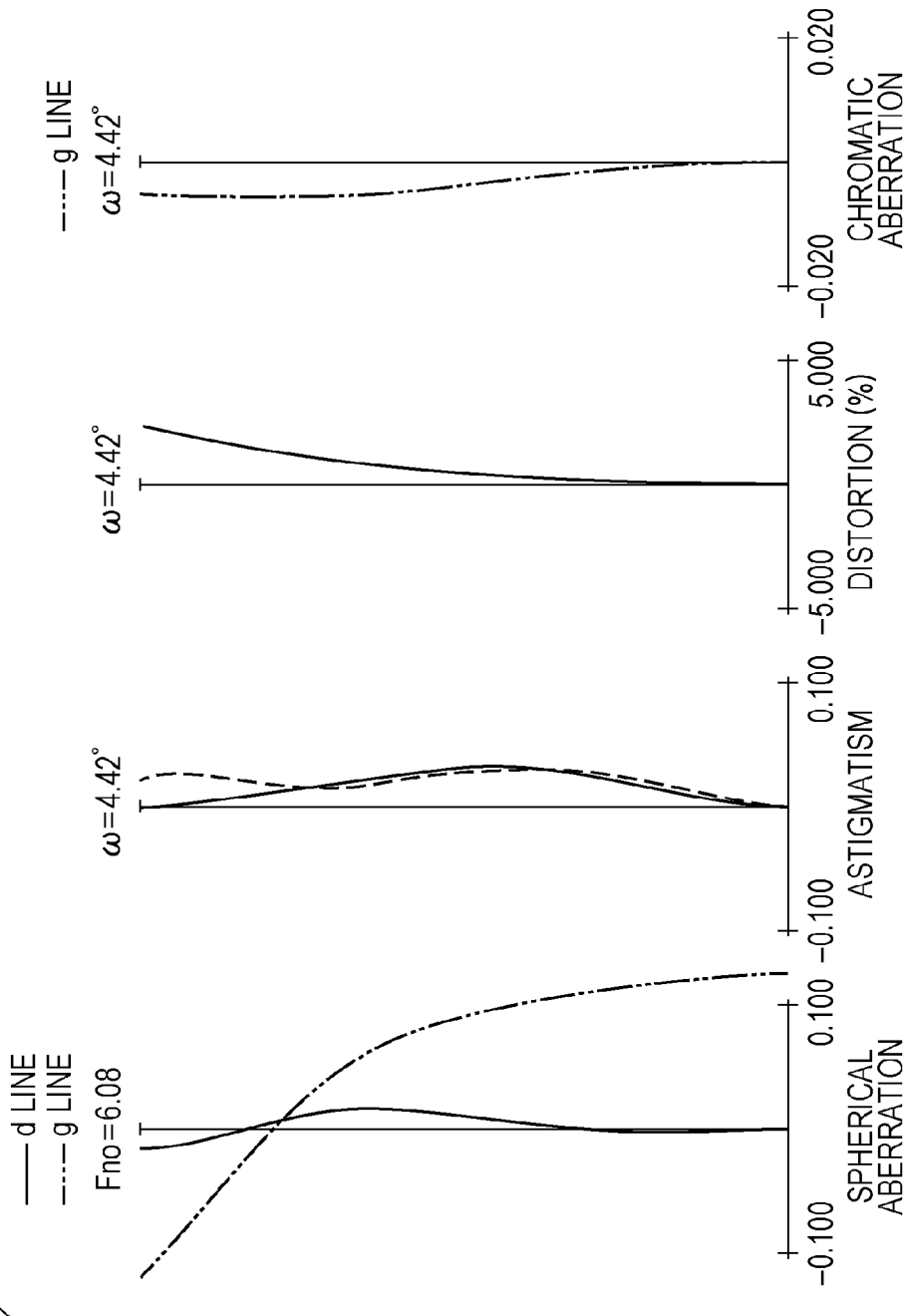

WIDE-ANGLE END

MIDDLE

TELEPHOTO END

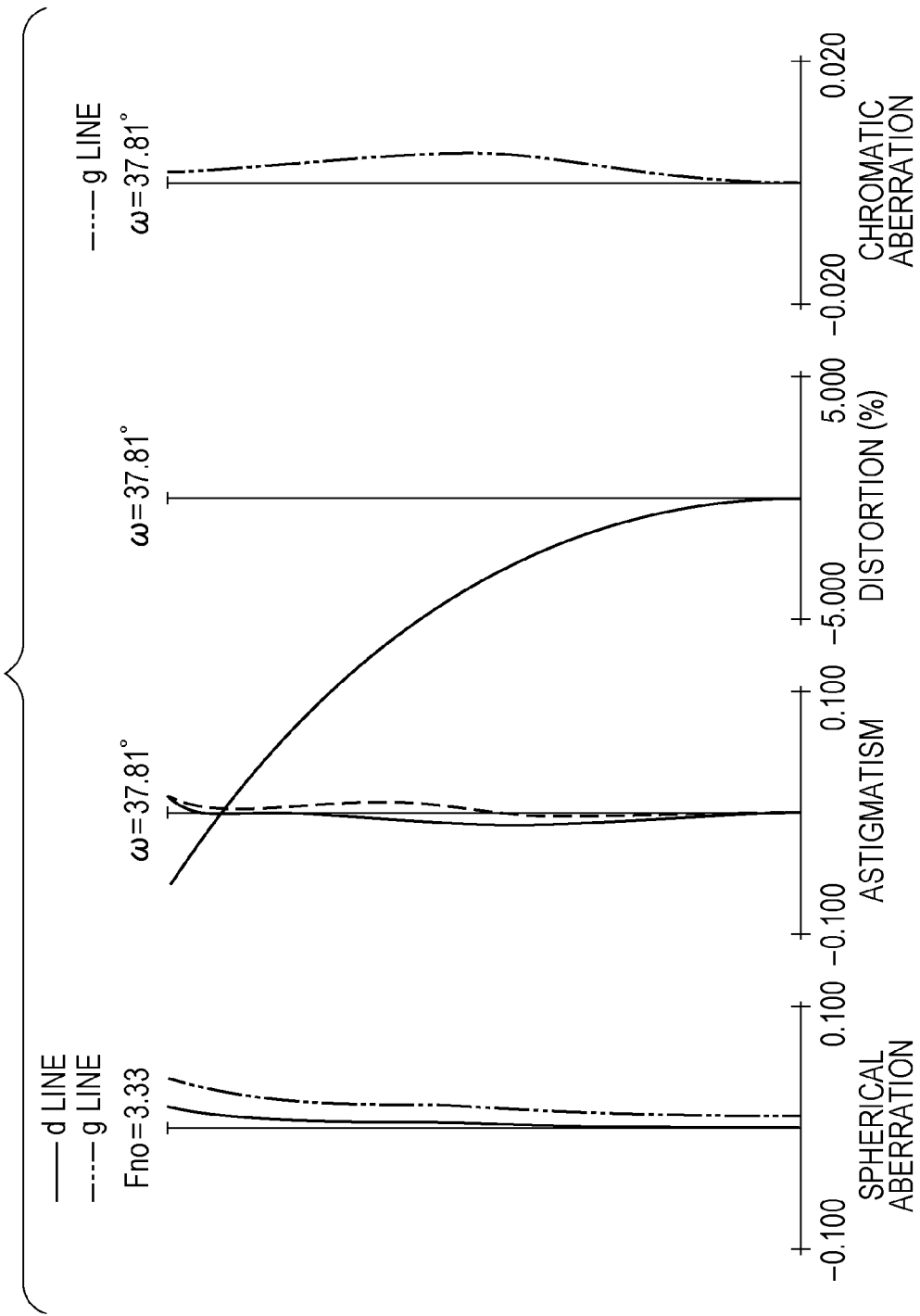

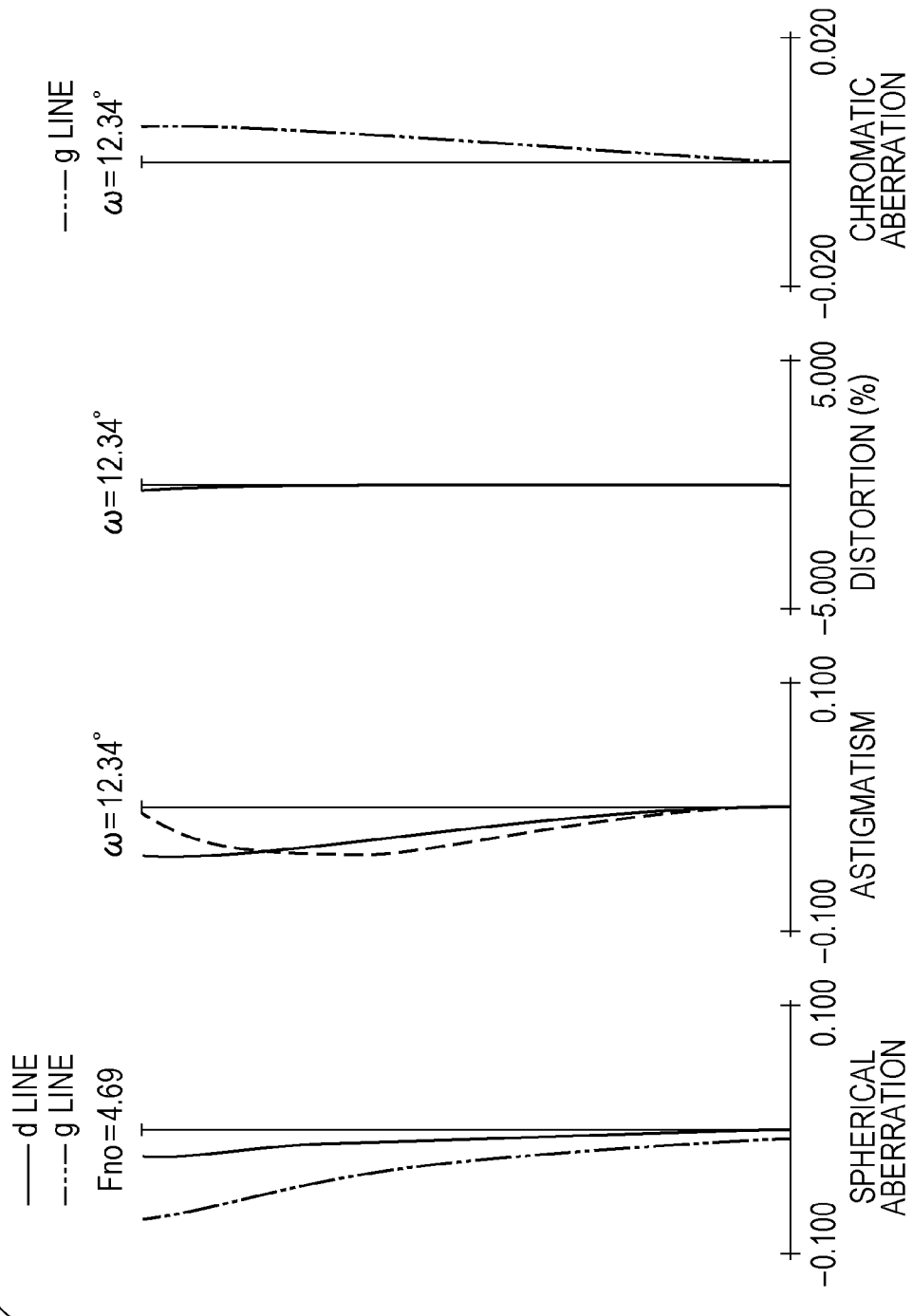

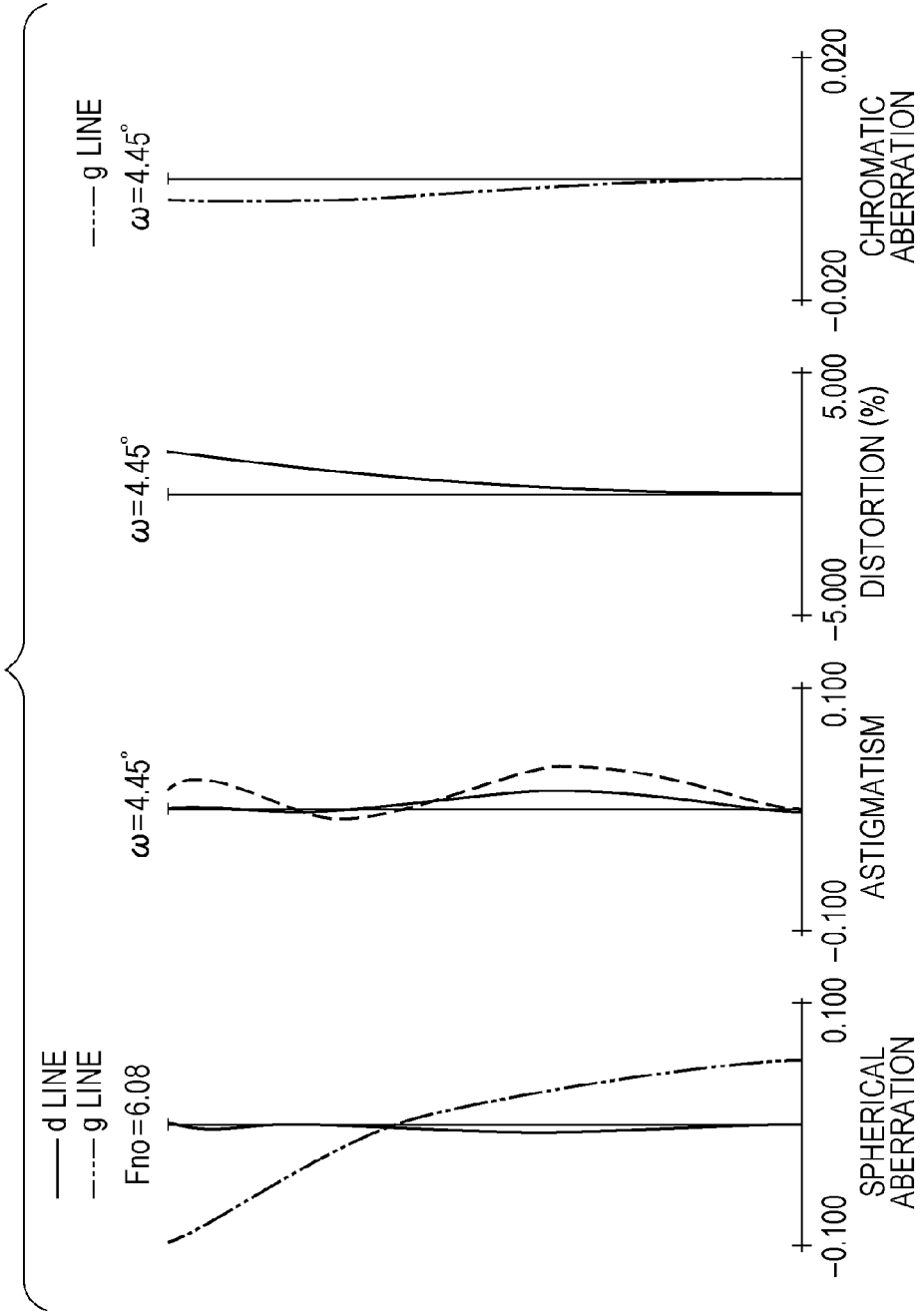

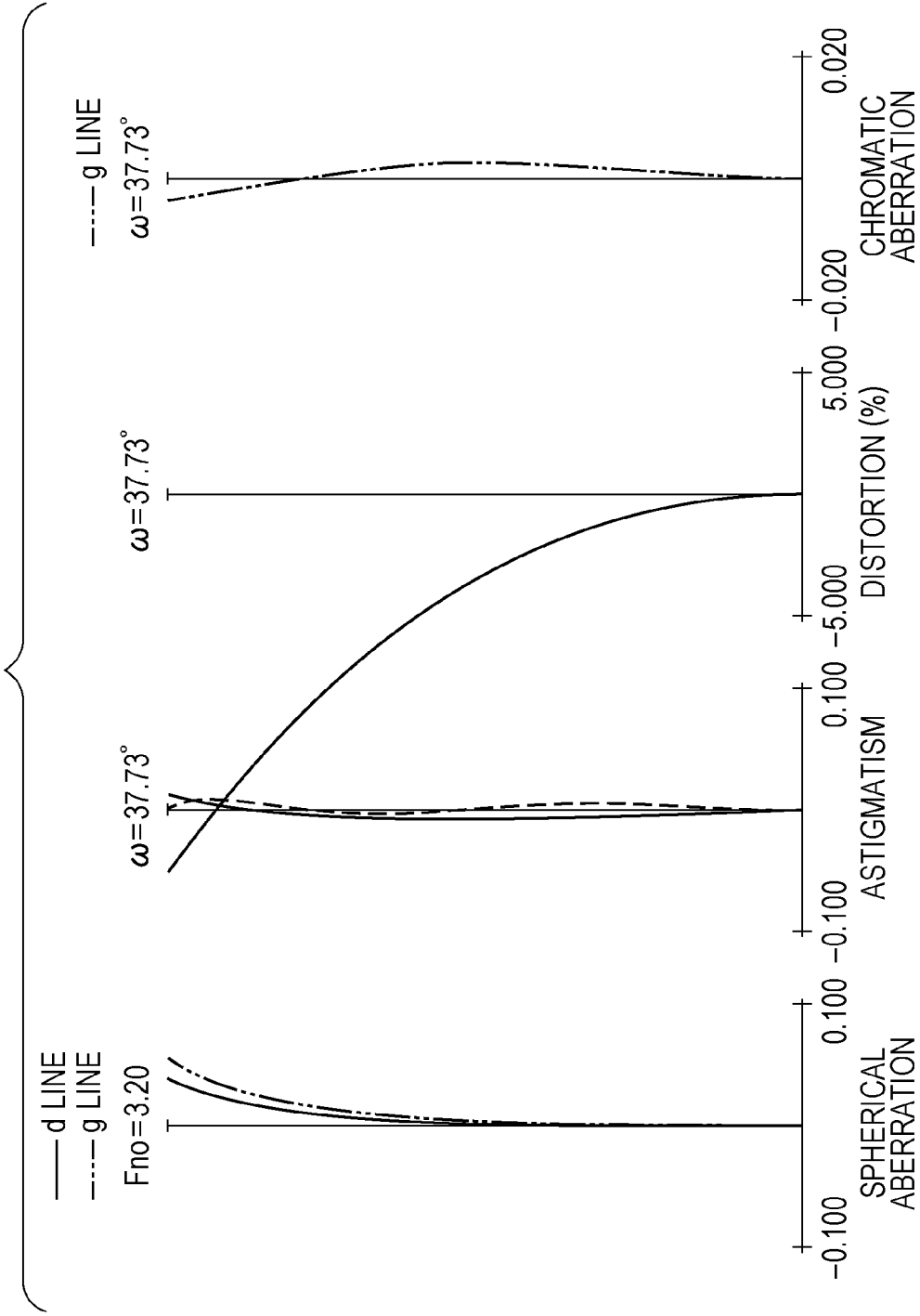

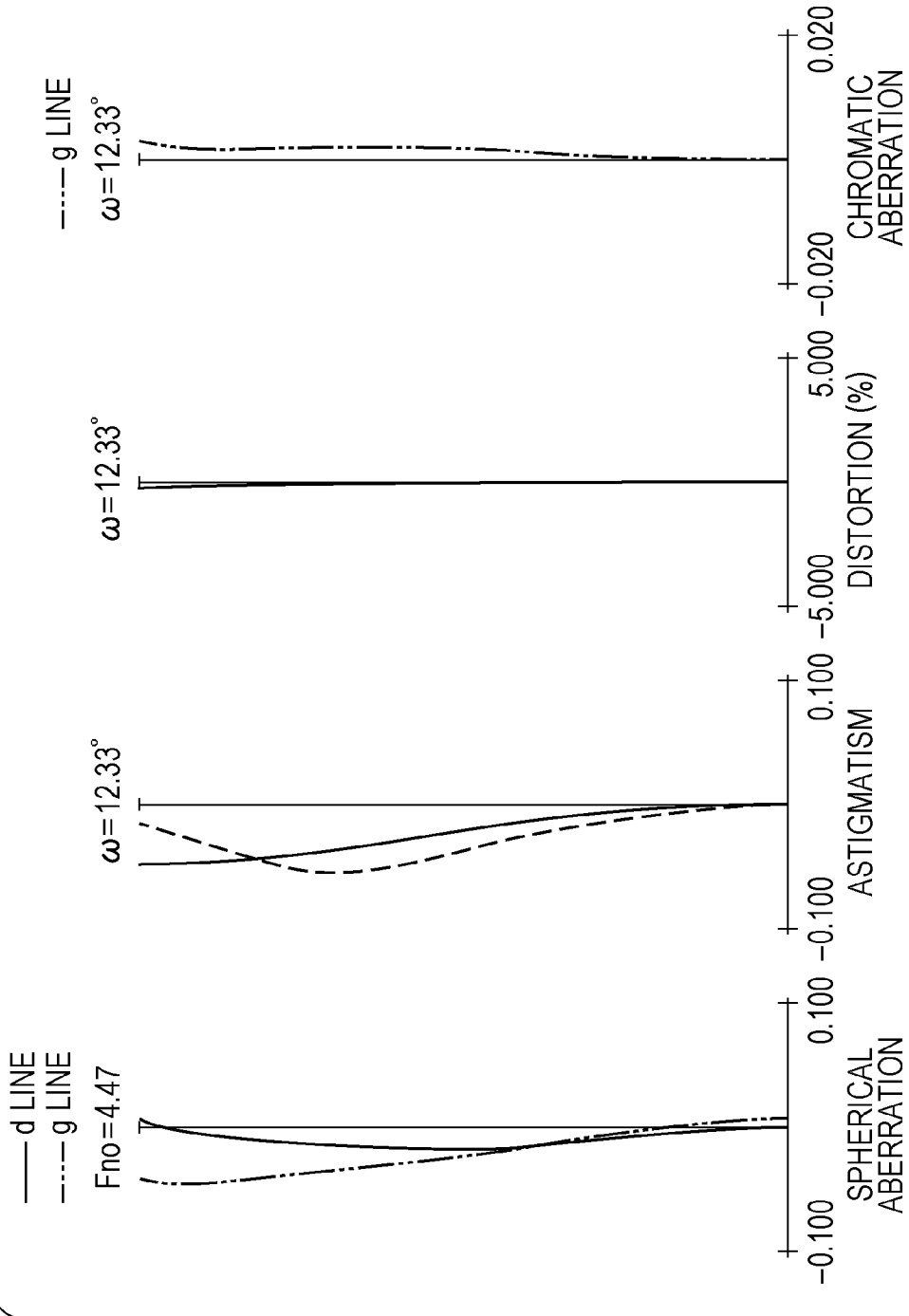

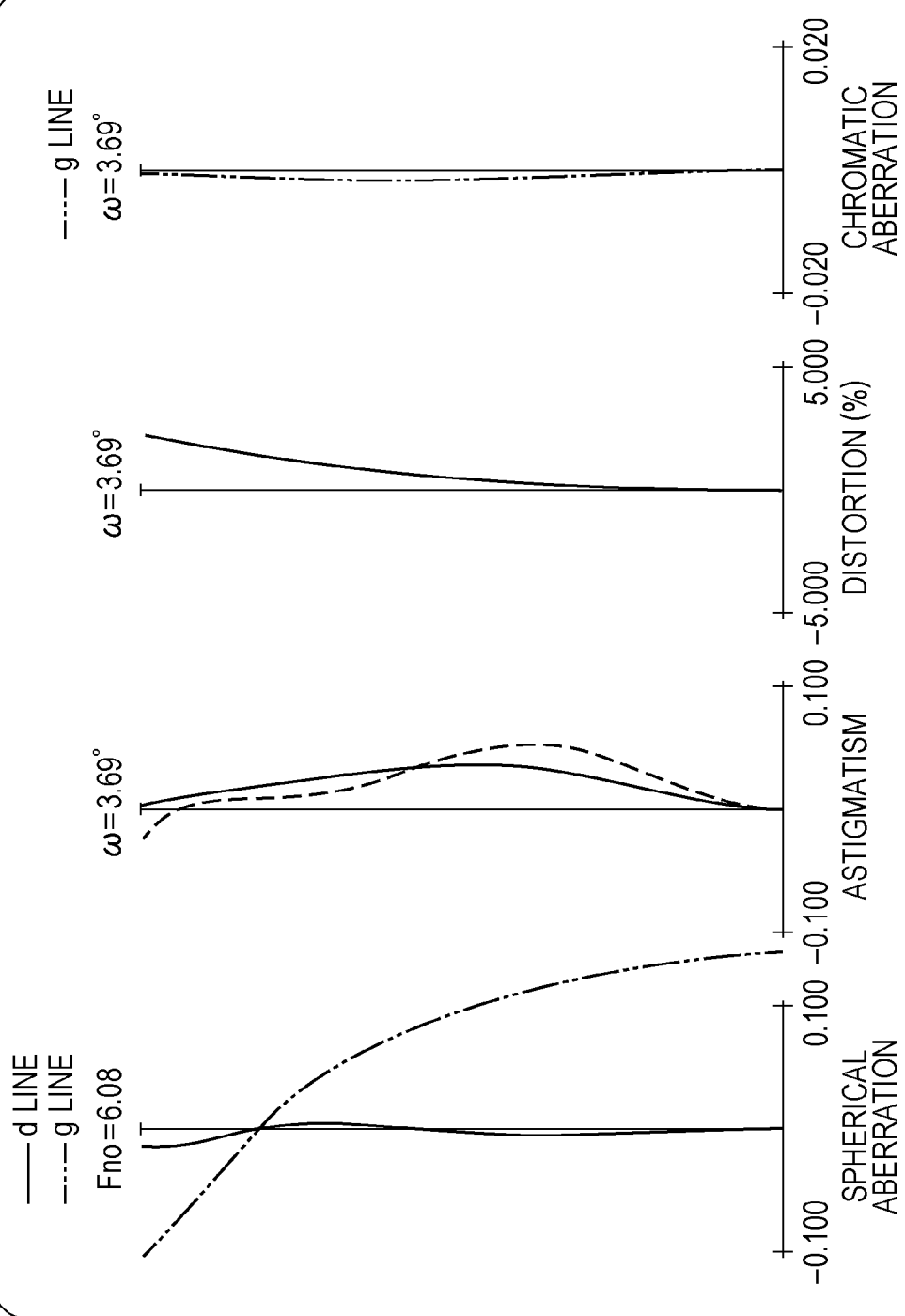

ZOOM LENS AND IMAGE PICKUP APPARATUS USING THE SAME

BACKGROUND OF THE INVENTION

1. Field of the Invention

The present invention relates to a zoom lens and an image pickup apparatus using the zoom lens. The zoom lens is particularly suitable for use in an image pickup optical system of video cameras, digital cameras, monitoring cameras, television cameras, and the like.

2. Description of the Related Art

As semiconductor and mechanical manufacturing technologies continue to improve, image pickup apparatuses such as video cameras, digital still cameras, broadcast cameras, and monitoring cameras that use solid-state image pickup devices, and silver-halide film cameras that use silver-based film are being manufactured in reduced size. As image pickup optical systems used for these image pickup apparatuses, there is a need for zoom lenses featuring a shorter total lens length (distance between a first lens surface and an image plane), reduced size, a higher zoom ratio, a higher resolving power, among other requirements.

As an example of a type of zoom lenses that satisfy some of these demands, a five-unit zoom lens is known. The five-unit zoom lens includes first to fifth lens units arranged sequentially in order from the object side to the image side of the zoom lens. The first lens unit has a positive refractive power, the second lens unit has a negative refractive power, the third lens unit has a positive refractive power, the fourth lens unit has a negative refractive power, and the fifth lens unit has a positive refractive power. These lens units are moved to perform zooming.

In general, a compact zoom lens, the size of which decreases with increasing zoom ratio, may be achieved by decreasing the number of lens elements included in each lens unit, increasing the refractive power of a main magnification varying lens unit, and by increasing the movement amount of the main magnification varying lens unit during zooming. By decreasing the number of lens elements in each lens unit and increasing the refractive power and the movement amount of the main magnification varying lens unit, a higher zoom ratio may be easily obtained. However, aberration fluctuation during zooming is increased, and accordingly, high optical performance over the entire zoom range is difficult to maintain.

In the above-described five-unit zoom lens, in order to reduce the size of the entire lens system, obtain a high zoom ratio, and achieve good optical performance, it is important to appropriately set a lens configuration and the refractive power of each lens unit, movement conditions of each lens unit for zooming, and the like.

Japanese Patent Laid-Open No. 1-241513 and U.S. Pat. No. 7,450,314 disclose zoom lenses, in which first and second lens units each include two lens elements, thereby reducing the sizes of lens units. The zoom ratio of the zoom lens disclosed in Japanese Patent Laid-Open No. 1-241513 is about 1.9, and the zoom ratio of the zoom lens disclosed in U.S. Pat. No. 7,450,314 is about 4.8 to 4.9. These zoom ratios may be insufficient to satisfy the above-outlined requirements of a modern zoom lens. Furthermore, an image-taking angle of view of the zoom lens disclosed in U.S. Pat. No. 7,450,314 is about 23.8 degrees at the wide-angle end. These image-taking angles of view may be insufficient.

The present invention provides a zoom lens that features a high zoom ratio and a wide angle of view, has a short total lens length, and achieves high optical performance over the entire zoom range. The present invention also provides an image pickup apparatus equipped with a zoom lens having the above characteristics.

SUMMARY OF THE INVENTION

A zoom lens according to the present invention includes a first lens unit that has a positive refractive power, a second lens unit that has a negative refractive power, a third lens unit that has a positive refractive power, a fourth lens unit that has a negative refractive power, and a fifth lens unit that has a positive refractive power. The first to fifth lens units are arranged sequentially from an object side to an image side. In the zoom lens, in comparison with a wide-angle end, at a telephoto end, a distance between the first lens unit and the second lens unit is increased, a distance between the second lens unit and the third lens unit is decreased, a distance between the third lens unit and the fourth lens unit is increased, and a distance between the fourth lens unit and the fifth lens unit is increased. In the zoom lens, in comparison with the wide-angle end, at the telephoto end, each lens unit moves so that the first lens unit is positioned closer to the object side. In the zoom lens, the first lens unit and the second lens unit each consist of a single positive lens element and a single negative lens element. In the zoom lens, when the distance between the third lens unit and the fourth lens unit at the wide-angle end is defined as $D34w$, the distance between the third lens unit and the fourth lens unit at the telephoto end is defined as $D34t$, and a focal length of the entire zoom lens at the wide-angle end is defined as $fw$, the following conditional expression is satisfied:

$$0.2 < (D34t - D34w)/fw < 1.2.$$

Further features of the present invention will become apparent from the following description of exemplary embodiments with reference to the attached drawings.

BRIEF DESCRIPTION OF THE DRAWINGS

FIGS. 2A, 2B, and 2C include aberration charts of the zoom lens according to the first embodiment of the present invention at the wide-angle end, at the middle zooming position, and at the telephoto end, respectively.

FIGS. 4A, 4B, and 4C include aberration charts of the zoom lens according to the second embodiment of the present invention at the wide-angle end, at the middle zooming position, and at the telephoto end, respectively.

FIGS. 6A, 6B, and 6C include aberration charts of the zoom lens according to the third embodiment of the present invention at the wide-angle end, at the middle zooming position, and at the telephoto end, respectively.

FIGS. 8A, 8B, and 8C include aberration charts of the zoom lens according to the fourth embodiment of the present invention at the wide-angle end, at the middle zooming position, and at the telephoto end, respectively.

FIGS. 10A, 10B, and 10C include aberration charts of the zoom lens according to the fifth embodiment of the present invention at the wide-angle end, at the middle zooming position, and at the telephoto end, respectively.

DESCRIPTION OF THE EMBODIMENTS

Embodiments of the present invention will be described in detail below with reference to the accompanying drawings. A zoom lens according to the present invention includes, sequentially from the object side to the image side, a first lens unit that has a positive refractive power, a second lens unit that has a negative refractive power, a third lens unit that has a positive refractive power, a fourth lens unit that has a negative refractive power, and a fifth lens unit that has a positive refractive power.

In comparison with a wide-angle end, at a telephoto end, the distance between the first lens unit and the second lens unit is increased, the distance between the second lens unit and the third lens unit is decreased, the distance between the third lens unit and the fourth lens unit is increased, and the distance between the fourth lens unit and the fifth lens unit is increased. Furthermore, in comparison with the wide-angle end, at the telephoto end, each lens unit is moved so that the first lens unit is positioned closer to an object side.

Figure 1A:
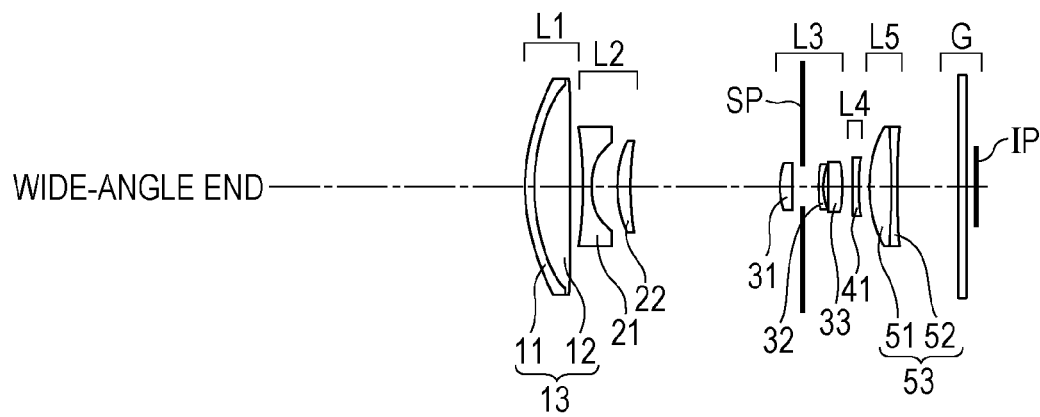
FIGS. 1A, 1B, and 1C are sectional views of lens elements of a zoom lens according to a first embodiment of the present invention at a wide-angle end, at a middle zooming position, and at a telephoto end, respectively.
Figure 1B:
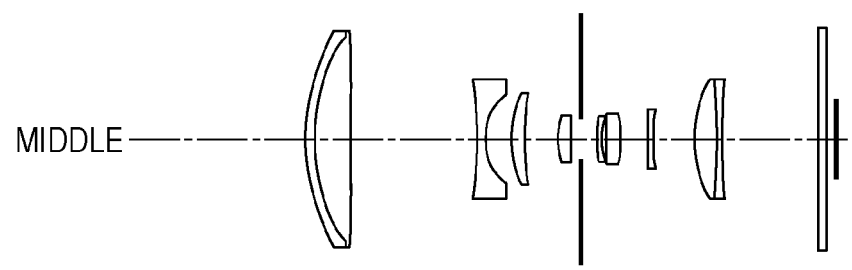
Figure 1C:
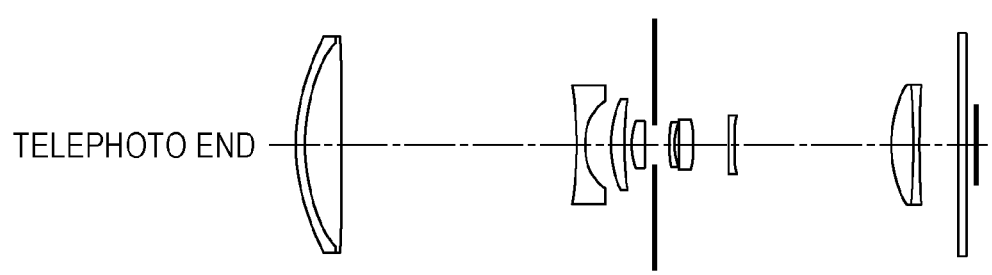

FIGS. 1A, 1B, and 1C are sectional views of lens elements of a zoom lens according to a first embodiment of the present invention at the wide-angle end (short focal length end), at a middle zooming position, and at the telephoto end (long focal length end), respectively. FIGS. 2A, 2B, and 2C include aberration charts of the zoom lens according to the first embodiment at the wide-angle end, at the middle zooming position, and at the telephoto end, respectively. The zoom lens according to the first embodiment has a zoom ratio of about 9.56 and an aperture ratio of about 3.36 to 6.08.

Figure 3A:
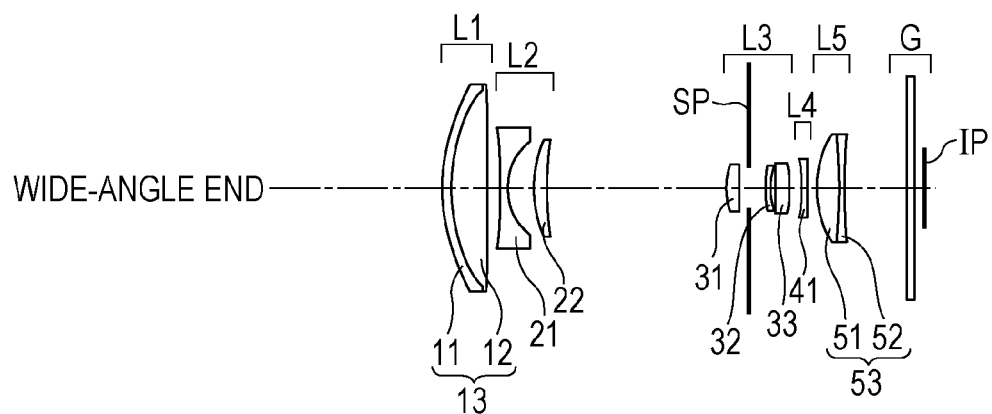
FIGS. 3A, 3B, and 3C are sectional views of lens elements of a zoom lens according to a second embodiment of the present invention at a wide-angle end, at a middle zooming position, and at a telephoto end, respectively.
Figure 3B:
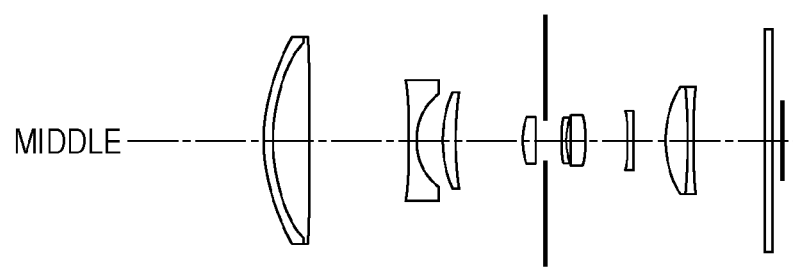
Figure 3C:
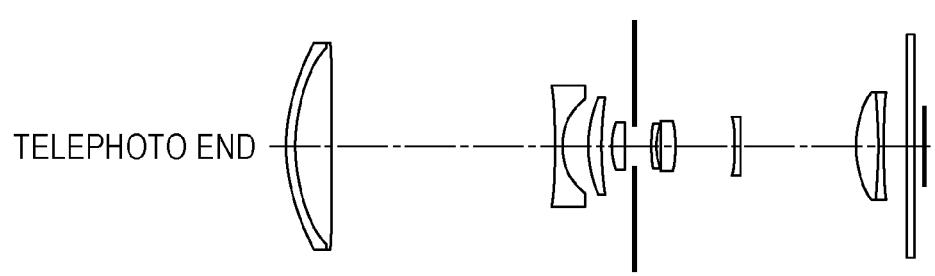

FIGS. 3A, 3B, and 3C are sectional views of lens elements of a zoom lens according to a second embodiment of the present invention at the wide-angle end, at the middle zooming position, and at the telephoto end, respectively. FIGS. 4A, 4B, and 4C include aberration charts of the zoom lens according to the second embodiment at the wide-angle end, at the middle zooming position, and at the telephoto end, respectively. The zoom lens according to the second embodiment has a zoom ratio of about 9.55 and an aperture ratio of about 3.46 to 6.08.

Figure 5A:
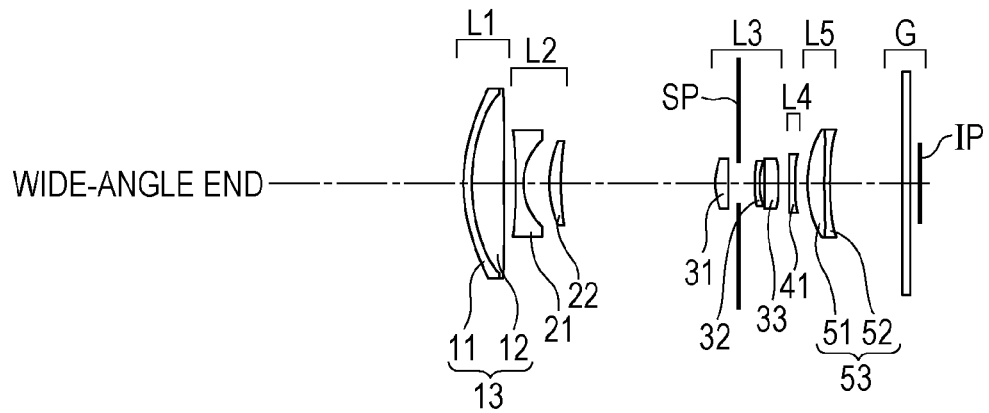
FIGS. 5A, 5B, and 5C are sectional views of lens elements of a zoom lens according to a third embodiment of the present invention at a wide-angle end, at a middle zooming position, and at a telephoto end, respectively.
Figure 5B:
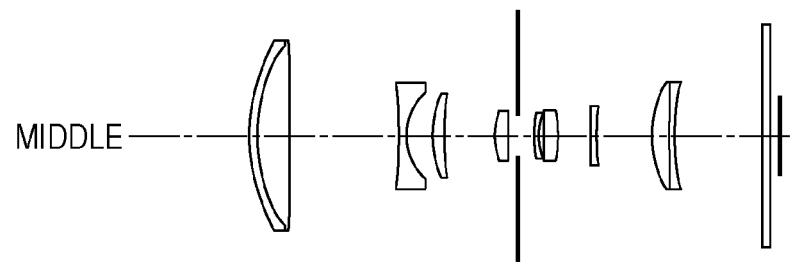
Figure 5C:
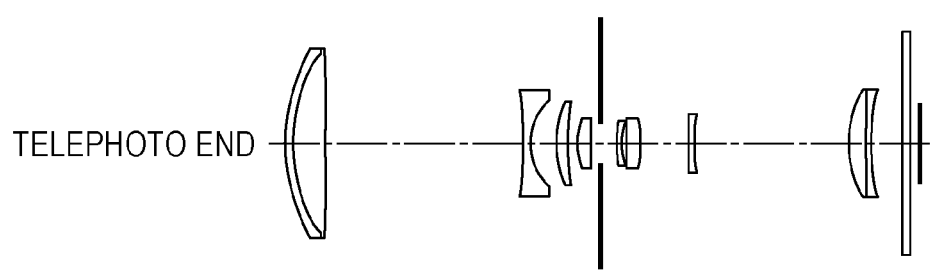

FIGS. 5A, 5B, and 5C are sectional views of lens elements of a zoom lens according to a third embodiment of the present invention at the wide-angle end, at the middle zooming position, and at the telephoto end, respectively. FIGS. 6A, 6B, and 6C include aberration charts of the zoom lens according to the third embodiment at the wide-angle end, at the middle zooming position, and at the telephoto end, respectively. The zoom lens according to the third embodiment has a zoom ratio of about 9.55 and an aperture ratio of about 3.36 to 6.08.

Figure 7A:
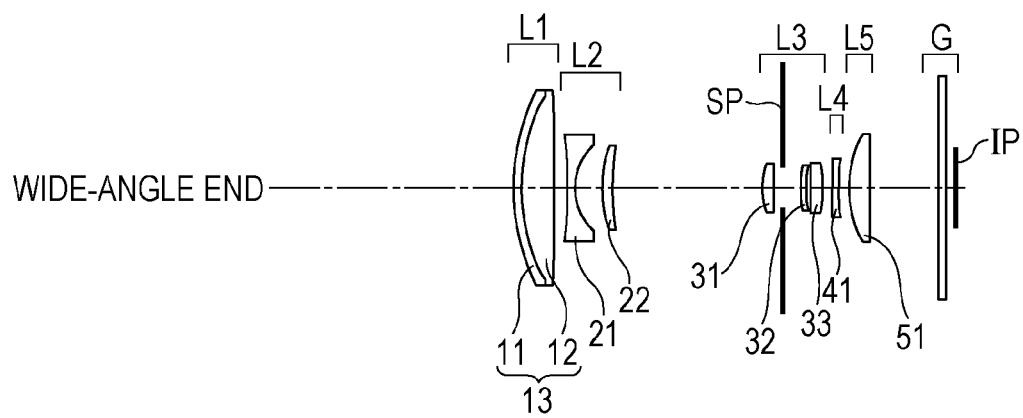
FIGS. 7A, 7B, and 7C are sectional views of lens elements of a zoom lens according to a fourth embodiment of the present invention at a wide-angle end, at a middle zooming position, and at a telephoto end, respectively.
Figure 7B:
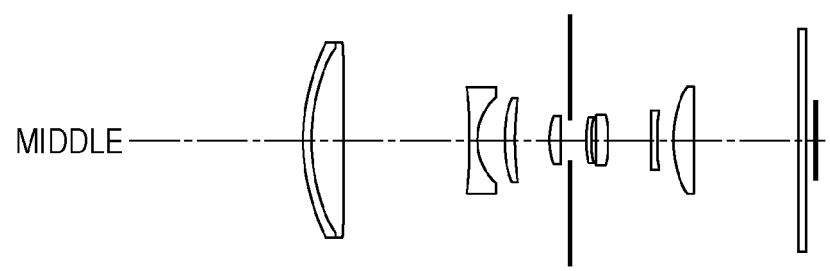
Figure 7C:
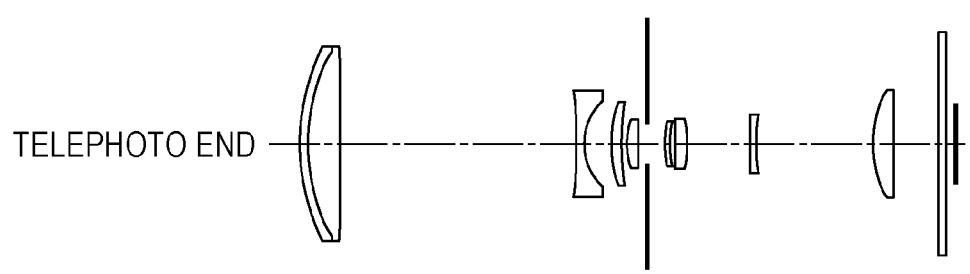

FIGS. 7A, 7B, and 7C are sectional views of lens elements of a zoom lens according to a fourth embodiment of the present invention at the wide-angle end, at the middle zooming position, and at the telephoto end, respectively. FIGS. 8A, 8B, and 8C include aberration charts of the zoom lens according to the fourth embodiment at the wide-angle end, at the middle zooming position, and at the telephoto end, respectively. The zoom lens according to the fourth embodiment has a zoom ratio of about 9.57 and an aperture ratio of about 3.33 to 6.08.

Figure 9A:
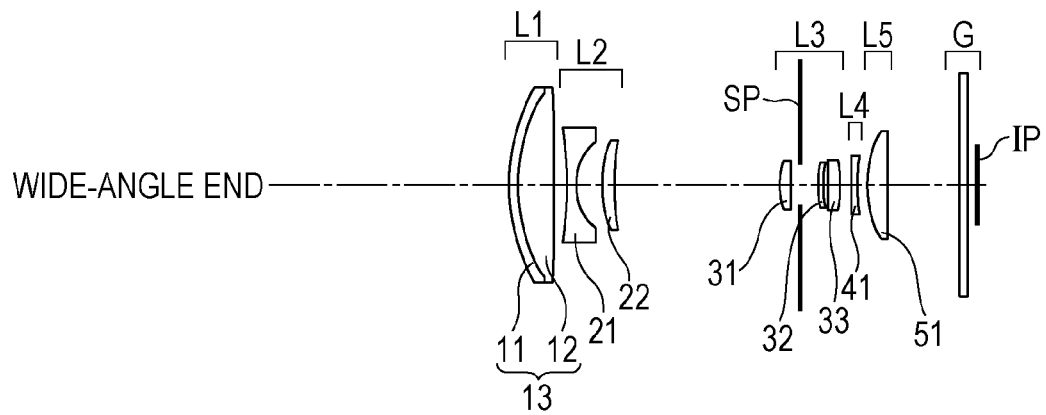
FIGS. 9A, 9B, and 9C are sectional views of lens elements of a zoom lens according to a fifth embodiment of the present invention at a wide-angle end, at a middle zooming position, and at a telephoto end, respectively.
Figure 9B:
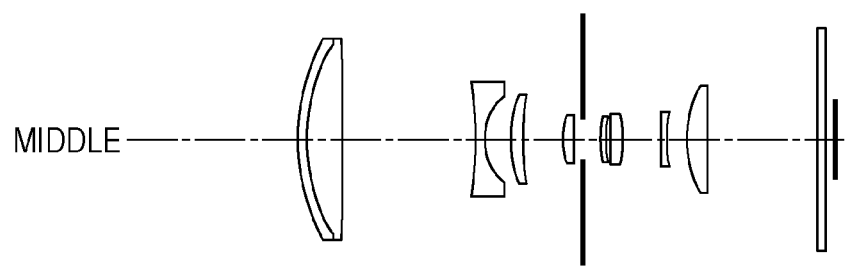
Figure 9C:
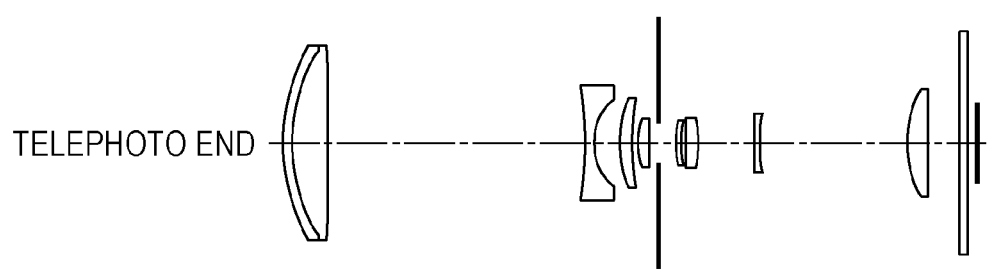

FIGS. 9A, 9B, and 9C are sectional views of lens elements of a zoom lens according to a fifth embodiment of the present invention at the wide-angle end, at the middle zooming position, and at the telephoto end, respectively. FIGS. 10A, 10B, and 10C include aberration charts of the zoom lens according to the fifth embodiment at the wide-angle end, at the middle zooming position, and at the telephoto end, respectively. The zoom lens according to the fifth embodiment has a zoom ratio of about 11.56 and an aperture ratio of about 3.20 to 6.08.

Figure 11:
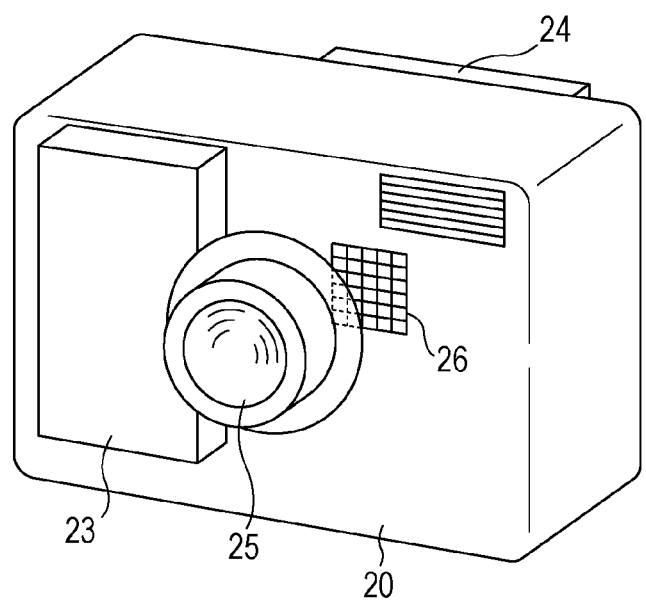
FIG. 11 is a schematic diagram illustrating a main portion of an image pickup apparatus according to the present invention.

FIG. 11 is a schematic diagram illustrating a main portion of an image pickup apparatus according to the present invention.

The zoom lens according to the present invention is used for image pickup apparatuses such as digital cameras, video cameras, and silver-halide film cameras, observation devices such as telescopes and binoculars, and optical devices such as copiers and projectors. In each of the sectional views of the lens elements, numbers indicate order of lens units from the object side to the image side. Thus, when a number is represented by i (i being a positive integer, for example, 1, 2, 3 . . . ), Li denotes an ith lens unit counted from the object side towards the image side.

Characteristics of the zoom lenses according to the first to fifth embodiments are described. In each sectional view of the lens elements, "L1" denotes the first lens unit having a positive refractive power (optical power, that is, the inverse of a focal length), "L2" denotes the second lens unit having a negative refractive power, "L3" denotes the third lens unit having a positive refractive power, "L4" denotes the fourth lens unit having a negative refractive power, and "L5" denotes the fifth lens unit having a positive refractive power.

"SP" denotes an F-number determination member (may also be referred to as "aperture stop" hereafter) that serves as an aperture stop that determines (limits) a light flux of an open F-number (Fno). "G" denotes an optical block that is equivalent to an optical filter, a face plate, a crystal low-pass filter, an infrared cut filter, or the like. "IP" denotes an image plane, on which an imaging surface of a solid-state image pickup device (photoelectric conversion device) such as a charge-coupled device (CCD) sensor or a complementary metal-oxide semiconductor (CMOS) sensor is provided when the zoom lens is used as an image pickup optical system of a video camera or a digital still camera. When the zoom lens is used as an image pickup optical system of a silver-halide film camera, a photosensitive surface equivalent to a film surface is provided on the image plane.

In each aberration chart, a solid line represents a d-line and a two-dot chain line represent a g-line in spherical aberration, a solid line represents a meridional image plane of d-line and a broken line represents a sagittal image plane of d-line in aspherical aberration, and magnification chromatic aberration is represented by a g-line. "Fno" denotes an F-number, and [ω] denotes a half angle of view.

In the zoom lens of each embodiment, when zooming from the wide-angle end to the telephoto end, the lens units are moved so that the distances between the lens units are changed as follows. That is, the distance between the first lens unit L1 and the second lens unit L2 is increased, the distance between the second lens unit L2 and the third lens unit L3 is decreased, the distance between the third lens unit L3 and the fourth lens unit L4 is increased, and the distance between the fourth lens unit L4 and the fifth lens unit L5 is increased.

In addition, in comparison with the wide-angle end, at the telephoto end, the first lens unit L1, the third lens unit L3, and the fourth lens unit L4 are moved so that the first lens unit L1, the third lens unit L3, and the fourth lens unit L4 are positioned closer to the object side. The second lens unit L2 is moved along a locus that is convex toward the image side, and the fifth lens unit L5 is moved along a locus that is convex toward the object side.

The F-number determination member SP is disposed inside the third lens unit L3 with respect to the optical axis direction. By disposing the F-number determination member SP, that is, the aperture stop SP as above, the distance between the second lens unit L2 and the third lens unit L3 can be decreased at the telephoto end. Thus, a sufficient amount of change, by which the distance between the second lens unit L2 and the third lens unit L3 can be changed for zooming, can be ensured. This allows a high zoom ratio to be easily achieved.

In the zoom lens of each embodiment, by increasing the refractive powers of the first lens unit L1 and the second lens unit L2 to some degree (conditional expressions (6) and (7), which will be described later), the distance between the first lens unit L1 and the aperture stop SP is decreased at the wide-angle end. Thus, the lens diameters of lens elements of the first lens unit L1 are decreased. Furthermore, by increasing the refractive power of the third lens unit L3 to some degree (conditional expression (11), which will be described later), the distance between the aperture stop SP and the image plane IP is decreased (shortened). Thus, the total lens length (distance between a first lens surface and the image plane) is decreased at the wide-angle end.

In the zoom lens of each embodiment, when zooming from the wide-angle end to the telephoto end, the first lens unit L1 is moved toward the object side. Thus, in comparison with the wide-angle end, at the telephoto end, the distance between the first lens unit L1 and the second lens unit L2 is increased, there by producing a magnification varying effect. Furthermore, when zooming from the wide-angle end to the telephoto end, the third lens unit L3 is moved toward the object side. Thus, in comparison with the wide-angle end, at the telephoto end, the distance between the second lens unit L2 and the third lens unit L3 is decreased, there by producing a magnification varying effect.

As described above, by producing the magnification varying effect using a plurality of parts, the lengths of movement strokes, by which the lens units are moved for magnification varying so as to obtain a high zoom ratio, are decreased, thereby decreasing the total lens length at the telephoto end. A focus fluctuation occurring during magnification varying is corrected by a movement of the fifth lens unit L5 along a locus that is convex toward the object side. With regard to focusing, by moving the first lens unit L1 or the fifth lens unit L5 toward the object side, focusing from an infinitely distant object to a near object is performed.

Furthermore, in the zoom lens of each embodiment, in comparison with the wide-angle end, at the telephoto end, the magnification varying effect is further produced by increasing the distance between the third lens unit L3 and the fourth lens unit L4 and the distance between the fourth lens unit L4 and the fifth lens unit L5. In particular, by appropriately increasing the distance between the third lens unit L3 and the fourth lens unit L4 (conditional expression (1), which will be described later), the magnification varying effect produced by the third lens unit L3 and the lens units after the third lens unit L3 is increased, thereby realizing a high zoom ratio.

With the above described lens configuration, the total lens length is decreased at the wide-angle end and the telephoto end and a high zoom ratio is obtained. In each embodiment, in order to correct hand shake (image blur), a movement including a movement perpendicular to the optical axial direction may be performed on a given lens unit, thereby moving an image position in a direction perpendicular to the optical axis.

Next, lens configuration of each lens unit is described. The first lens unit L1 includes, sequentially from the object side to the image side, a cemented lens element 13 formed of a negative lens element 11 and a positive lens element 12 cemented to each other. In each embodiment, the first lens unit L1 is achromatized and formed of a minimum number of lens elements, thereby correcting chromatic aberration and reducing the size of the first lens unit L1. Here, in order to reduce the size of the first lens unit L1, the refractive powers of the negative lens element 11 and the positive lens element 12 can be decreased as much as possible so as to decrease the thickness of each lens element.

In each embodiment, in order for the first lens unit L1 to have a target refractive power and in order to reduce the refractive powers of the negative lens element 11 and the positive lens element 12, the positive lens element 12 is formed of a low dispersion material having a large Abbe number and the negative lens element 11 is formed of a highly dispersive material having a very small Abbe number. Thus, the first lens unit L1 is achromatized without increasing the refractive power of each lens element. In particular, axial chromatic aberration and magnification chromatic aberration are desirably corrected on the telephoto side.

Furthermore, the positive lens element 12 is formed of a low dispersion material having a large Abbe number so as to suppress the occurrence of axial chromatic aberration and magnification chromatic aberration on the telephoto side, thereby preventing an increase in refractive power of the negative lens element 11. In addition, in order to desirably correct spherical aberration on the telephoto side and field curvature and an astigmatic difference on the wide-angle side using a small number of lens elements, in the first lens unit L1, a lens surface closest to the object side is convex toward the object side and a lens surface closest to the image side is convex toward the image side with a smaller curvature than that of the lens surface closest to the object side.

When the curvature of the lens surface on the object side is small, an incident angle of an off-axis beam at the wide-angle end is increased. This leads to frequent occurrence of field curvature and an astigmatic difference. In order to reduce the occurrence of spherical aberration on the telephoto side, the lens surfaces on the object side and the image side can perform respective shares of aberration correction. Thus, the occurrence of spherical aberration is reduced with a shape factor in which the curvature of the lens surface on the object side is greater than that of the lens surface on the image side. With the above-described configuration of the first lens unit L1, the size of the first lens unit L1 is reduced and various aberrations are corrected by the first lens unit L1 in a well-balanced manner.

The second lens unit L2 includes, sequentially from the object side to the image side, a negative lens element 21 and a positive lens element 22. The negative lens element 21 has concave surfaces that respectively face the object side and the image side. The concave surface that faces the image side has a larger absolute value of the refractive power than that of a concaved surface that faces the object side. A convex surface of the positive lens element 22 faces the object side.

In each embodiment, the second lens unit L2 is achromatized and formed of a minimum number of lens elements, thereby correcting chromatic aberration and reducing the size of the second lens unit L2. Here, in order to reduce the size of the second lens unit L2 and obtain a target focal length of the second lens unit L2, the thicknesses of the negative lens element 21 and the positive lens element 22 can be decreased as much as possible and the distance between the negative lens element 21 and the positive lens element 22 can be decreased as much as possible.

In each embodiment, the negative lens element 21 is formed of a low dispersion material having a large Abbe number and the positive lens element 22 is formed of a high dispersion material having a very small Abbe number. The distance between the negative lens element 21 and the positive lens element 22 is decreased and the refractive power of each lens is decreased. Thus, the second lens unit L2 is achromatized and the size thereof is being reduced. Regarding chromatic aberration, magnification chromatic aberration over an entire zoom range, in particular magnification chromatic aberration at the wide-angle end, can be corrected.

Furthermore, the negative lens element 21 is formed of a material having a high refractive index of greater than 1.8, thereby reducing field curvature and distortion aberration at the wide-angle end. The negative lens element 21 is formed to have an aspherically shaped lens surface so that the negative refractive power decreases from the center thereof toward the periphery thereof. This can correct various aberrations. With the above-described configuration of the second lens unit L2, size reduction of the second lens unit L2 and correction of various aberrations in the second lens unit L2 are performed in a well-balanced manner. When the size of the second lens unit L2 is reduced, the distance between the first lens unit L1 and the aperture stop SP is decreased, thereby facilitating further reduction of the size of the first lens unit L1.

The third lens unit L3 includes, from the object side to the image side, a positive lens element 31, a negative lens element 32, and a positive lens element 33. The convex surface of the positive lens element 31 faces the object side. The concave surface of the negative lens element 32 faces the image side. In each embodiment, in order to increase the magnification varying effect produced by the third lens unit L3 and to reduce the total lens length at the wide-angle end, the refractive power of the third lens unit L3 is increased to some degree. In this situation, various aberrations occur in the third lens unit L3, in particular, spherical aberration, coma aberration, axial chromatic aberration, and the like frequently occur over the entire zoom range.

In each embodiment, the positive refractive power of the third lens unit L3 is provided such that the two positive lens elements of the third lens unit L3 have positive refractive powers so as to reduce the occurrence of these various aberrations. The positive lens element 31 is formed to have an aspherical shape so that the positive refractive power decreases from the center thereof toward the periphery thereof. This can further correct spherical aberration and coma aberration. The fourth lens unit L4 includes a single negative lens element 41. In each embodiment, the fourth lens unit L4 includes a small number of lens elements so as to reduce the width and the weight thereof.

The fifth lens unit L5 illustrated in FIGS. 1, 3, and 5 includes, sequentially from the object side to the image side, a cemented lens element 53 formed of a positive lens element 51 and a negative lens element 52 cemented to each other. By using a cemented lens, the occurrence of magnification chromatic aberration is reduced over the entire zoom range even when the refractive power of the fifth lens unit L5 is increased to some degree.

The fifth lens unit L5 illustrated in FIGS. 7 and 9 includes only the positive lens element 51. By forming the positive lens element 51 of a low dispersion material, the occurrence of magnification chromatic aberration is reduced. Furthermore, the weight of the fifth lens unit L5 can be reduced. Thus, when focusing with the fifth lens unit L5 can be quickly performed.

In each embodiment, the first lens unit L1 and the second lens unit L2 each include a single positive lens element and a single negative lens element. When the distances between the third lens unit L3 and the fourth lens unit L4 at the wide-angle end and the telephoto end are respectively defined as $D34w$ and $D34t$, and the focal length of an entire zoom lens at the wide-angle end is defined as fw, the following conditional expression is satisfied: $0.2<(D34t-D34w)/fw<1.2$ (1). Conditional expression (1) defines the amount of change in distance between the third lens unit L3 and the fourth lens unit L4 when zooming from the wide-angle end to the telephoto end.

When the amount of change in distance between the third lens unit L3 and the fourth lens unit L4 is excessively large such that the upper limit of conditional expression (1) is exceeded, fluctuation in magnification chromatic aberration due to zooming is increased, and accordingly, good optical performance over the entire zoom range is difficult to obtain. When the amount of change in distance between the third lens unit L3 and the fourth lens unit L4 is excessively small such that the lower limit of conditional expression (1) is exceeded, the magnification varying effect for magnification varying produced by changing the distance between the third lens unit L3 and the fourth lens unit L4 is decreased. In this situation, in order to obtain a target zoom ratio, a change in distance between the first lens unit L1 and the second lens unit L2 may be increased when zooming from the wide-angle end to the telephoto end. However, this leads to an increase in the total lens length at the telephoto end. More preferably, the range of the value in the expression (1) is set as follows:

$$0.3<(D34t-D34w)/fw<1.1 \tag{1a}$$

As described above, with each embodiment, a zoom lens is obtained, in which various aberrations can be corrected over the entire zoom range and a small lens unit size, a wider image-taking angle of view at the wide-angle end, and a high zoom ratio can be achieved.

In each embodiment, one or more of the following conditional expressions can be satisfied. The parameters of the zoom lens are defined as follows. The moving distance of the first lens unit L1 in zooming from the wide-angle end to the telephoto end is defined as M1. Here, the moving distance refers to a difference in the optical axis direction between the position of the lens unit at the wide-angle end and the position of the lens unit at the telephoto end. The sign of the moving distance is positive when the lens unit moves, in comparison with the wide-angle end, at the telephoto end, closer to the image side and is negative when the lens unit moves, in comparison with the wide-angle end, at the telephoto end, closer to the object side.

The focal length of the first lens unit L1 is defined as f1; the focal length of the second lens unit L2 is defined as f2; the focal length of the third lens unit L3 is defined as f3; the focal length of the fourth lens unit L4 is defined as f4; and the focal length of the fifth lens unit L5 is defined as f5. The focal length of the positive lens element 12 of the first lens unit L1 is defined as f1p; and the focal length of the negative lens element 21 of the second lens unit L2 is defined as f2n.

The lateral magnifications of the third lens unit L3, the fourth lens unit L4, and the fifth lens unit L5 at the wide-angle end are respectively defined as $\beta 3w$, $\beta 4w$, and $\beta 5w$. The lateral magnifications of the third lens unit L3, the fourth lens unit L4, and the fifth lens unit L5 at the telephoto end are respectively defined as β3t, β4t, and β5t. The focal length of the entire zoom lens at the telephoto end is defined as ft.

The Abbe numbers of the materials of the positive lens element 12 and the negative lens element 11 of the first lens unit L1 are respectively defined as ν1p and ν1n. The Abbe numbers of the materials of the positive lens element 22 and the negative lens element 21 of the second lens unit L2 are respectively defined as ν2p and ν2n. The radius of curvature of the lens surface closest to the object side in the first lens unit L1 is defined as R1a; and the radius of curvature of the lens surface closest to the image side in the first lens unit L1 is defined as R1b. The distance between the negative lens element 21 and the positive lens element 22 of the second lens unit L2 is defined as L. As described above, one or more of the following conditional expressions can be satisfied.

$$-5.0 < M1/fw < -2.0 \quad (2)$$

$$3.0 < |f4|/fw < 6.0 \quad (3)$$

$$0.3 < f1p/f1 < 0.9 \quad (4)$$

$$0.3 < f2n/f2 < 0.9 \quad (5)$$

$$4.0 < f1/fw < 10.0 \quad (6)$$

$$0.8 < |f2|/fw < 2.0 \quad (7)$$

$$0.2 < \{(\beta 3t \times \beta 4t \times \beta 5t)/(\beta 3w \times \beta 4w \times \beta 5w)\}/(ft/fw) < 0.5 \quad (8)$$

$$0.03 < 1/\nu 1n - 1/\nu 1p < 0.05 \quad (9)$$

$$0.02 < 1/\nu 2p - 1/\nu 2n < 0.04 \quad (10)$$

$$1.0 < f3/fw < 3.0 \quad (11)$$

$$3.0 < f5/fw < 6.0 \quad (12)$$

$$-1.5 < (R1a+R1b)/(R1a-R1b) < -0.5 \quad (13)$$

$$0.2 < L/|f2| < 0.5 \quad (14)$$

Next, technical meaning of each of the above-described conditional expressions is described.

Conditional expression (2) defines the movement amount of the first lens unit L1 when zooming from the wide-angle end to the telephoto end. When the movement amount toward the object side is excessively small such that the upper limit of conditional expression (2) is exceeded, the magnification varying effect produced by changing the distance between the first lens unit L1 and the second lens unit L2 is decreased. When the magnification varying effect is compensated for by increasing the refractive power of the first lens unit L1, spherical aberration on the telephoto side is increased.

When the magnification varying effect is compensated for by increasing the refractive power of the second lens unit L2, field curvature on the wide-angle side and spherical aberration on the telephoto side are increased. When the movement amount toward the object side is excessively large such that the lower limit of conditional expression (2) is exceeded, the total lens length is increased at the telephoto end, and accordingly, reduction in size of the entire zoom lens becomes difficult.

Conditional expression (3) defines the focal length of the fourth lens unit L4, that is, the refractive power of the fourth lens unit L4. When the refractive power of the fourth lens unit L4 is excessively small such that the upper limit of conditional expression (3) is exceeded, the magnification varying effect produced by changing the distance between the third lens unit L3 and the fourth lens unit L4 is decreased, and accordingly, a target zoom ratio is difficult to obtain. When the decrease in magnification varying effect is compensated for by changing the distance between the first lens unit L1 and the second lens unit L2, the movement amount of the first lens unit L1 is increased, and accordingly, the total lens length at the telephoto end is increased.

When the refractive power of the fourth lens unit L4 is excessively large such that the lower limit of conditional expression (3) is exceeded, spherical aberration and axial chromatic aberration frequently occur. When the number of lens elements of the fourth lens unit L4 is increased in order to correct these aberrations, the size of the fourth lens unit L4 is increased.

Conditional expression (4) defines the focal length of the positive lens element 12 of the first lens unit L1. When the first lens unit L1 includes a single positive lens and is achromatized, the value of f1p/f1 becomes less than 1. When the value of conditional expression (4) exceeds the upper limit and approaches 1, effects of achromatization are decreased, and accordingly, correction for axial chromatic aberration and magnification chromatic aberration becomes insufficient on the telephoto side. When the lower limit of conditional expression (4) is exceeded, the refractive power of the positive lens element 12 becomes excessively large, and accordingly, spherical aberration frequently occurs on the telephoto side. When the number of positive lens elements of the first lens unit L1 is increased in order to correct spherical aberration in this situation, the size of the first lens unit L1 is increased.

Conditional expression (5) defines the focal length of the negative lens element 21 of the second lens unit L2. With the second lens unit L2, a distribution of refractive power of a retro focus type, in which a lens unit having a negative refractive power is disposed at the front, is realized, so that size reduction of the entire zoom lens and a wide angle of view are achieved.

When the focal length is excessively large such that the upper limit of conditional expression (5) is exceeded, that is, the refractive power is excessively small, effects by which the distribution of refractive power of the retro focus type using the second lens unit L2 are decreased, and accordingly, an increase in angle of view and reduction in the size of the entire zoom lens become difficult. Here, in order to increase the angle of view, the distance between the negative lens element 21 and the positive lens element 22 needs to be increased to some degree. Thus, reduction in the size of the second lens unit L2 becomes difficult. When the focal length is excessively small such that the lower limit of conditional expression (5) is exceeded, that is, the refractive power is excessively large, field curvature and an astigmatic difference frequently occur at the wide-angle side.

Conditional expression (6) defines the focal length of the first lens unit L1, that is, the refractive power of the first lens unit L1. When the refractive power is excessively small such that the upper limit of conditional expression (6) is exceeded, the magnification varying effect decreases. When the magnification varying effect is compensated for by increasing the amount of the movement of the first lens unit L1, the total lens length is increased at the telephoto end. When the magnification varying effect is compensated for by increasing the refractive power of the third lens unit L3, various aberrations such as spherical aberration, coma aberration, and axial chromatic aberration frequently occur.

When the refractive power of the first lens unit L1 is excessively large such that the lower limit of conditional expression (6) is exceeded, spherical aberration of the first lens unit L1 frequently occurs on the telephoto side. When the number of lens elements is increased in order to correct such aberration, the size of the first lens unit L1 is increased, thereby increasing the front lens diameter.

Conditional expression (7) defines the focal length of the second lens unit L2, that is, the refractive power of the second lens unit L2. When the refractive power of the second lens unit L2 is excessively small such that the upper limit of conditional expression (7) is exceeded, the magnification varying effect produced by the second lens unit L2 is decreased, and accordingly, a target zoom ratio is difficult to obtain. When the refractive power of the second lens unit L2 is excessively large such that the lower limit of conditional expression (7) is exceeded, field curvature on the wide-angle side relative to the second lens unit L2 and spherical aberration on the telephoto side relative to the second lens unit L2 frequently occur.

Conditional expression (8) defines a share of zoom ratio of a combined system of the third to fifth lens units L3 to L5. When the share of zoom ratio of the combined system is excessively large such that the upper limit of conditional expression (8) is exceeded, a share of zoom ratio of the second lens unit L2 is decreased, and accordingly, size reduction of the first lens unit L1 and the second lens unit L2 is facilitated.

However, when the refractive powers of the third lens unit L3, the fourth lens unit L4, and the fifth lens unit L5 are increased in order to increase the share of zoom ratio of the combined system, various aberrations frequently occur. When the refractive powers of the third lens unit L3 and the fourth lens unit L4 are increased, spherical aberration, coma aberration, and axial chromatic aberration frequently occur. When the refractive power of the fifth lens unit L5 is increased, field curvature frequently occurs.

When the share of zoom ratio of the combined system is excessively small such that the lower limit of conditional expression (8) is exceeded, the share of zoom ratio of the second lens unit L2 needs to be increased. When the magnification varying effect is increased by increasing the refractive power of the second lens unit L2, field curvature and an astigmatic difference frequently occur on the wide-angle side.

Conditional expression (9) defines the Abbe numbers of the materials of the negative lens element 11 and the positive lens element 12 of the first lens unit L1. As the difference between the reciprocals of the Abbe numbers increases, the refractive power of each lens element desired for achromatization can be decreased.

When the difference between the reciprocals of the Abbe numbers is excessively large such that the upper limit of conditional expression (9) is exceeded, the refractive power of each lens element can be decreased, and accordingly, the thickness of each lens element can be decreased. In this case, the material of the negative lens element 11 is a high dispersion material. However, when dispersion characteristics of the material are excessively high, the partial dispersion ratio is increased. When the partial dispersion ratio is excessively high, secondary spectrum of axial chromatic aberration and magnification chromatic aberration is increased on the telephoto side, thereby increasing chromatic blur even when achromatization is performed. When the difference between the reciprocals of the Abbe numbers is excessively small such that the lower limit of conditional expression (9) is exceeded, the refractive power of each lens element desired for achromatization increases, thereby increasing the size of the first lens unit L1.

Conditional expression (10) defines the difference between the reciprocals of the Abbe numbers of the materials of the positive lens element 22 and the negative lens element 21 of the second lens unit L2. As the difference between the reciprocals of the Abbe numbers increases, the refractive power of each lens element desired for achromatization can be decreased.

When the difference between the reciprocals of the Abbe numbers is excessively large such that the upper limit of conditional expression (10) is exceeded, the refractive power of each lens element can be decreased, and accordingly, the thickness of each lens element can be decreased. In this case, the material of the positive lens element 22 is a high dispersion material. However, when dispersion characteristics of the material are excessively high, the partial dispersion ratio is increased. When the partial dispersion ratio is excessively high, secondary spectrum in magnification chromatic aberration is increased on the wide-angle side, thereby increasing chromatic blur even when achromatization is performed.

When the difference between the reciprocals of the Abbe numbers is excessively small such that the lower limit of conditional expression (10) is exceeded, the refractive power of each lens element desired for achromatization becomes excessively large, and accordingly, distortion aberration and field curvature frequently occur on the wide-angle side and spherical aberration frequently occurs on the telephoto side.

Conditional expression (11) defines the focal length of the third lens unit L3, that is, the refractive power of the third lens unit L3. When the refractive power of the third lens unit L3 is excessively small such that the upper limit of conditional expression (11) is exceeded, the magnification varying effect produced by the third lens unit L3 is decreased, and accordingly, a target zoom ratio is difficult to obtain. When the refractive power of the third lens unit L3 is excessively large such that the lower limit of conditional expression (11) is exceeded, spherical aberration, coma aberration, and axial chromatic aberration frequently occur in the third lens unit L3.

Conditional expression (12) defines the focal length of the fifth lens unit L5, that is, the refractive power of the fifth lens unit L5. When the refractive power of the fifth lens unit L5 is excessively small such that the upper limit of conditional expression (12) is exceeded, effects of correcting focus fluctuation during magnification varying are decreased, thereby increasing the movement amount performed for focusing. Thus, quick focusing becomes difficult to perform.

When the refractive power of the fifth lens unit L5 is excessively large such that the lower limit of conditional expression (12) is exceeded, the Petzval sum is increased, and accordingly, field curvature is increased over the entire zoom range. When the number of lens elements is increased so as to suppress the occurrence of field curvature, the lens weight of the fifth lens unit L5 is increased, and accordingly, torque for driving the fifth lens unit L5 is undesirably increased.

Conditional expression (13) defines the lens shape factor of the cemented lens element 13 of the first lens unit L1. When the value of conditional expression (13) is from 0 to −1, the cemented lens element 13 has a biconvex shape in which the lens surface on the object side has a larger curvature than the lens surface on the image side. When the value of conditional expression (13) is smaller than −1, the cemented lens element 13 has a meniscus shape in which the lens surface on the object side has a convex shape. When the curvature of the convex shape of the lens surface on the object side is decreased and the curvature of the convex shape of the lens surface on the image side is increased such that the upper limit of conditional expression (13) is exceeded, field curvature frequently occurs on the wide-angle side.

When the curvature of the convex of the lens surface on the object side is excessively large such that the lower limit of conditional expression (13) is exceeded, spherical aberration frequently occurs on the telephoto side. Furthermore, in order for the lens surfaces on the object side and the image side to perform respective shares of correction of spherical aberration in a well-balanced manner, conditional expression (13) can be satisfied.

Conditional expression (14) defines the distance between the negative lens element 21 and the positive lens element 22 of the second lens unit L2. With the second lens unit L2, a distribution of refractive power of a retro focus type, in which a lens unit having a negative refractive power is provided at the front, is realized, so that the angle of view is increased and the size of the entire zoom lens is reduced. This distribution of refractive power largely depends upon arrangement of a concave surface of a negative lens facing the image side and a convex surface of a positive lens facing the object side. An increase in angle of view and reduction in the size of the entire zoom lens are facilitated by decreasing the distance L to some degree and increasing the refractive power of each lens surface to some degree.

When the distance L is excessively large such that the upper limit of conditional expression (14) is exceeded, the thickness of the second lens unit L2 in the optical axis direction increases, thereby increasing the size of the second lens unit L2. When the size of the second lens unit L2 is increased, the distance between the first lens unit L1 and the aperture stop SP is increased, thereby increasing the effective front lens diameter. When the distance L is excessively small such that the lower limit of conditional expression (14) is exceeded, size reduction of the second lens unit L2 is facilitated. However, the refractive powers of the negative lens element 21 and the positive lens element 22 become excessively large, and accordingly, distortion aberration and field curvature frequently occur on the wide-angle side and spherical aberration frequently occurs on the telephoto side. The ranges of the values of conditional expressions (2) to (14) are more preferably set as follows:

$$-4.5 < M1/fw < -2.5 \quad (2a)$$

$$3.5 < |f4|/fw < 5.5 \quad (3a)$$

$$0.50 < f1p/f1 < 0.85 \quad (4a)$$

$$0.5 < f2n/f2 < 0.8 \quad (5a)$$

$$5.0 < f1/fw < 9.0 \quad (6a)$$

$$1.0 < |f2|/fw < 1.7 \quad (7a)$$

$$0.22 < \{(\beta 3t \times \beta 4t \times \beta 5t)/(\beta 3w \times \beta 4w \times \beta 5w)\}/(ft/fw) < 0.40 \quad (8a)$$

$$0.035 < 1/v1n - 1/v1p < 0.048 \quad (9a)$$

$$0.025 < 1/v2p - 1/v2n < 0.038 \quad (10a)$$

$$1.5 < f3/fw < 2.5 \quad (11a)$$

$$3.3 < f5/fw < 5.5 \quad (12a)$$

$$-1.3 < (R1a + R1b)/(R1a - R1b) < -0.6 \quad (13a)$$

$$0.25 < L/|f2| < 0.45 \quad (14a)$$

As described above, according to each embodiment, a zoom lens and an image pickup apparatus using the zoom lens can be obtained. In this zoom lens, the size of lens units are reduced, and a high zoom ratio of about or larger than 10 and a wide image-taking angle of view of 35 degrees or larger at the wide-angle end are achieved.

Next, numerical embodiments according the embodiments of the present invention are listed. In each numerical embodiment, a "Surface No." (surface number) represents an ordinal position of a surface from the object side. In each numerical example, when a surface number is i (i being a positive integer, e.g., i=1, 2, 3 . . . ), "ri" denotes the radius of curvature of an ith lens surface closest to the object side, "di" denotes an ith lens thickness or an air gap closest to the object side, and "ndi" and "vdi" respectively denote a refractive index and the Abbe number of a material of an ith lens closest to the object side. The aspherical surface shape is given by the following equation:

$$X = \frac{(1/R)H^2}{1 + \sqrt{1 - (1+K)(H/R)^2}} + A4 \times H^4 + A6 \times H^6 + A8 \times H^8 + A10 \times H^{10}$$

where the X-axis represents the optical axis direction, the H-axis represents a direction perpendicular to the optical axis, the moving direction of light is assumed to be positive, R is a paraxial radius of curvature, K represents a conic constant, and A4, A6, A8, and A10 are respective aspherical surface coefficients.

In each aspherical surface, the notation "e+x" represents the exponential notation "×10$^x$" and "e−x" represents "×10$^{-x}$". BF is the air converted distance (back focus) between the last surface of the zoom lens to the paraxial image plane. The Total lens length is calculated by adding BF to the distance between the frontmost surface of the zoom lens to the last surface of the zoom lens. An aspherical surface is denoted by an asterisk "*" added next to the surface number.

First Numerical Embodiment

| Unit: mm | | | | |
|---|---|---|---|---|
| Surface Data | | | | |
| Surface No. | r | d | nd | vd |
| 1 | 20.650 | 0.80 | 1.95906 | 17.5 |
| 2 | 17.488 | 3.50 | 1.55332 | 71.7 |
| 3* | −359.338 | (variable) | | |
| 4* | −25.796 | 0.70 | 1.85135 | 40.1 |
| 5* | 5.023 | 2.50 | | |
| 6 | 10.101 | 1.20 | 1.95906 | 17.5 |
| 7 | 20.039 | (variable) | | |
| 8* | 7.048 | 1.20 | 1.58313 | 59.4 |
| 9* | −41.006 | 0.92 | | |
| 10 (aperture stop) | ∞ | 1.48 | | |
| 11 | 11.557 | 0.50 | 1.92286 | 18.9 |
| 12 | 6.440 | 0.40 | | |
| 13 | 56.317 | 1.40 | 1.60311 | 60.6 |
| 14 | −10.373 | (variable) | | |
| 15 | −34.865 | 0.50 | 1.48749 | 70.2 |
| 16 | 17.990 | (variable) | | |
| 17 | 11.617 | 2.10 | 1.77250 | 49.6 |
| 18 | −64.509 | 0.60 | 1.95906 | 17.5 |
| 19 | 81.531 | (variable) | | |
| 20 | ∞ | 0.80 | 1.51633 | 64.1 |
| 21 | ∞ | 0.90 | | |
| Image plane | ∞ | | | |

-continued

Unit: mm

Aspherical Surface Data

Surface 3

K = −5.25201e+003 A4 = −5.32692e−006 A6 = 1.38160e−007
A8 = −1.21432e−009 A10 = 4.58382e−012
Surface 4

K = −5.93737e+000 A4 = −1.05872e−004 A6 = 1.35712e−005
A8 = −4.27092e−007 A10 = 5.42567e−009
Surface 5

K = −7.84622e−001 A4 = −1.58812e−004 A6 = 3.33811e−005
A8 = −1.64768e−006 A10 = 4.75099e−008
Surface 8

K = −1.80199e+000 A4 = 1.63638e−004 A6 = 5.62224e−005
A8 = −1.34525e−006 A10 = −4.81908e−007
Surface 9

K = −1.84161e+002 A4 = −2.39636e−004 A6 = 7.88378e−005
A8 = −1.54282e−006 A10 = −6.56528e−007

Miscellaneous Data
Zoom ratio 9.56

|  | Wide-angle | Middle | Telephoto |
|---|---|---|---|
| Focal length | 5.13 | 17.23 | 49.00 |
| F-number | 3.36 | 4.65 | 6.08 |
| Angle of view | 37.53 | 12.89 | 4.43 |
| Image height | 3.33 | 3.88 | 3.88 |
| total lens length | 42.39 | 49.91 | 64.07 |
| BF | 7.19 | 10.54 | 5.09 |
| d3 | 1.22 | 11.95 | 22.28 |
| d7 | 14.18 | 3.23 | 0.74 |
| d14 | 1.00 | 2.55 | 3.31 |
| d16 | 1.00 | 3.84 | 14.85 |
| d19 | 5.77 | 9.11 | 3.66 |

Zoom Lens Unit Data

| Lens unit | Most object side surface | Focal length |
|---|---|---|
| 1 | 1 | 39.82 |
| 2 | 4 | −7.43 |
| 3 | 8 | 10.20 |
| 4 | 15 | −24.27 |
| 5 | 17 | 18.79 |
| 6 | 20 | ∞ |

Second Numerical Embodiment

Unit: mm

Surface Data

| Surface No. | r | d | nd | νd |
|---|---|---|---|---|
| 1 | 19.196 | 0.80 | 1.95906 | 17.5 |
| 2 | 16.670 | 3.80 | 1.49700 | 81.5 |
| 3* | −153.334 | (variable) | | |
| 4* | −86.714 | 0.70 | 2.00000 | 35.0 |
| 5* | 5.055 | 2.50 | | |
| 6 | 10.374 | 1.20 | 1.95906 | 17.5 |
| 7 | 24.936 | (variable) | | |
| 8* | 6.760 | 1.30 | 1.58313 | 59.4 |
| 9* | −28.022 | 0.92 | | |
| 10 (aperture stop) | ∞ | 1.48 | | |
| 11 | 12.833 | 0.50 | 1.92286 | 18.9 |
| 12 | 6.622 | 0.59 | | |
| 13 | −15.354 | 1.30 | 1.60311 | 60.6 |

-continued

Unit: mm

| 14 | −6.671 | (variable) | | |
|---|---|---|---|---|
| 15 | −17.789 | 0.50 | 1.48749 | 70.2 |
| 16 | 35.611 | (variable) | | |
| 17* | 10.299 | 2.00 | 1.69680 | 55.5 |
| 18 | −343.760 | 0.60 | 1.95906 | 17.5 |
| 19 | 43.475 | (variable | | |
| 20 | ∞ | 0.80 | 1.51633 | 64.1 |
| 21 | ∞ | 0.90 | | |
| Image plane | ∞ | | | |

Aspherical Surface Data

Surface 3

K = −7.31962e+002 A4 = −1.14926e−005 A6 = 2.33213e−007
A8 = −2.00137e−009 A10 = 7.71487e−012
Surface 4

K = 9.98388e+001 A4 = −2.44978e−005 A6 = −9.36072e−006
A8 = 4.56818e−007 A10 = −5.66208e−009
Surface 5

K = −7.29895e−001 A4 = 2.81012e−005 A6 = −1.52919e−005
A8 = 2.94629e−007 A10 = 1.40575e−008
Surface 8

K = −1.45251e+000 A4 = 1.10320e−003 A6 = 7.89281e−005
A8 = 4.45072e−006 A10 = 1.51504e−006
Surface 9

K = 1.54426e+001 A4 = 1.54338e−003 A6 = 1.03118e−004
A8 = 1.01919e−006 A10 = 2.61339e−006
Surface 17

K = 3.36016e−002 A4 = −2.80855e−005 A6 = 5.01565e−006
A8 = −2.92177e−007 A10 = 5.91860e−009

Miscellaneous Data
Zoom ratio 9.55

|  | Wide-angle | Middle | Telephoto |
|---|---|---|---|
| Focal length | 5.13 | 14.13 | 49.00 |
| F-number | 3.46 | 4.59 | 6.08 |
| Angle of view | 37.25 | 15.54 | 4.42 |
| Image height | 3.33 | 3.88 | 3.88 |
| Total lens length | 45.80 | 49.33 | 60.70 |
| BF | 7.38 | 8.21 | 3.55 |
| d3 | 0.98 | 9.40 | 21.09 |
| d7 | 17.25 | 6.40 | 1.01 |
| d14 | 1.00 | 3.89 | 5.60 |
| d16 | 1.00 | 3.23 | 11.25 |
| d19 | 5.95 | 6.78 | 2.12 |

Zoom Lens Unit Data

| Lens unit | Most object side surface | Focal length |
|---|---|---|
| 1 | 1 | 38.76 |
| 2 | 4 | −7.74 |
| 3 | 8 | 10.75 |
| 4 | 15 | −24.26 |
| 5 | 17 | 21.23 |
| 6 | 20 | ∞ |

Third Numerical Embodiment

Unit: mm

Surface Data

| Surface No. | r | d | nd | νd |
|---|---|---|---|---|
| 1 | 18.753 | 0.80 | 1.95906 | 17.5 |
| 2 | 15.707 | 3.10 | 1.55332 | 71.7 |

-continued

Unit: mm

| Surface | r | d | nd | vd |
|---|---|---|---|---|
| 3* | −160.894 | (variable) | | |
| 4* | −64.140 | 0.70 | 2.00000 | 40.0 |
| 5* | 4.871 | 2.50 | | |
| 6 | 9.816 | 1.00 | 1.95906 | 17.5 |
| 7 | 19.152 | (variable) | | |
| 8* | 7.197 | 1.30 | 1.58313 | 59.4 |
| 9* | −94.659 | 0.92 | | |
| 10 (aperture stop) | ∞ | 1.48 | | |
| 11 | 12.242 | 0.50 | 1.92286 | 18.9 |
| 12 | 7.287 | 0.45 | | |
| 13 | 198.604 | 1.40 | 1.60311 | 60.6 |
| 14 | −8.528 | (variable) | | |
| 15 | 295.690 | 0.50 | 1.77250 | 49.6 |
| 16 | 17.091 | (variable) | | |
| 17 | 10.318 | 1.60 | 1.77250 | 49.6 |
| 18 | 60.617 | 0.50 | 1.95906 | 17.5 |
| 19 | 22.477 | (variable) | | |
| 20 | ∞ | 0.80 | 1.51633 | 64.1 |
| 21 | ∞ | 0.90 | | |
| Image plane | ∞ | | | |

Aspherical Surface Data

Surface 3

K = −1.22802e+003 A4 = −2.19988e−005 A6 = 5.18159e−007
A8 = −6.21518e−009 A10 = 3.31735e−011
Surface 4

K = −6.06367e+001 A4 = −4.68198e−004 A6 = 1.30669e−005
A8 = 3.99678e−008 A10 = −4.01391e−009
Surface 5

K = −8.83708e−001 A4 = −2.73111e−004 A6 = 1.75621e−006
A8 = 6.74486e−007 A10 = 1.04767e−008
Surface 8

K = −2.30247e−001 A4 = 3.34672e−004 A6 = 4.87173e−005
A8 = 1.42402e−006 A10 = 2.27189e−007
Surface 9

K = 6.11738e+002 A4 = 1.04239e−003 A6 = 7.94055e−005
A8 = −1.80702e−006 A10 = 5.97972e−007

Miscellaneous Data
Zoom ratio 9.55

| | Wide-angle | Middle | Telephoto |
|---|---|---|---|
| Focal length | 5.13 | 16.66 | 49.00 |
| F-number | 3.36 | 4.67 | 6.08 |
| Angle of view | 37.52 | 13.19 | 4.42 |
| Image height | 3.33 | 3.88 | 3.88 |
| Total lens length | 43.03 | 50.18 | 59.99 |
| BF | 8.30 | 9.79 | 4.38 |
| d3 | 1.02 | 10.33 | 18.67 |
| d7 | 14.77 | 4.95 | 0.95 |
| d14 | 1.00 | 3.12 | 4.61 |
| d16 | 1.20 | 5.26 | 14.64 |
| d19 | 6.87 | 8.36 | 2.95 |

Zoom Lens Unit Data

| Lens unit | Most object side surface | Focal length |
|---|---|---|
| 1 | 1 | 34.44 |
| 2 | 4 | −6.69 |
| 3 | 8 | 10.02 |
| 4 | 15 | −23.50 |
| 5 | 17 | 25.77 |
| 6 | 20 | ∞ |

Fourth Numerical Embodiment

Unit: mm

Surface Data

| Surface No. | r | d | nd | vd |
|---|---|---|---|---|
| 1 | 21.306 | 0.80 | 2.10205 | 16.8 |
| 2 | 18.439 | 3.10 | 1.55332 | 71.7 |
| 3* | −238.729 | (variable) | | |
| 4* | −18.558 | 0.70 | 1.85135 | 40.1 |
| 5* | 5.112 | 2.50 | | |
| 6 | 11.913 | 1.00 | 2.10205 | 16.8 |
| 7 | 25.397 | (variable) | | |
| 8* | 6.722 | 1.20 | 1.58313 | 59.4 |
| 9* | −41.301 | 0.92 | | |
| 10 (aperture stop) | ∞ | 1.48 | | |
| 11 | 11.609 | 0.50 | 1.92286 | 18.9 |
| 12 | 6.246 | 0.46 | | |
| 13 | 87.268 | 1.20 | 1.60311 | 60.6 |
| 14 | −9.505 | (variable) | | |
| 15 | −44.923 | 0.50 | 1.88300 | 40.8 |
| 16 | 41.160 | (variable) | | |
| 17* | 11.788 | 1.90 | 1.55332 | 71.7 |
| 18 | −400.833 | (variable) | | |
| 19 | ∞ | 0.80 | 1.51633 | 64.1 |
| 20 | ∞ | 0.90 | | |
| Image plane | ∞ | | | |

Aspherical Surface Data

Surface 3

K = −1.61561e+003 A4 = −7.25163e−006 A6 = 1.37358e−007
A8 = −1.19462e−009 A10 = 5.11325e−012
Surface 4

K = −1.56497e+001 A4 = −1.85047e−004 A6 = 1.26819e−005
A8 = −4.33901e−007 A10 = 6.21283e−009
Surface 5

K = −8.62527e−001 A4 = −9.93858e−005 A6 = 2.71283e−005
A8 = −1.68074e−006 A10 = 4.40656e−008
Surface 8

K = −1.29443e+000 A4 = 1.30136e−004 A6 = 2.48392e−005
A8 = 2.20976e−006 A10 = −3.98877e−007
Surface 9

K = −2.97320e+002 A4 = −2.77740e−004 A6 = 7.79317e−005
A8 = −3.65264e−006 A10 = −9.96629e−008
Surface 17

K = −3.43047e−001 A4 = −1.69549e−005 A6 = 3.54151e−006
A8 = −1.49724e−007 A10 = 2.86780e−009

Miscellaneous Data
Zoom ratio 9.57

| | Wide-angle | Middle | Telephoto |
|---|---|---|---|
| Focal length | 5.12 | 17.75 | 49.00 |
| F-number | 3.33 | 4.69 | 6.08 |
| Angle of view | 37.81 | 12.34 | 4.45 |
| Image height | 3.33 | 3.88 | 3.88 |
| Total lens length | 41.80 | 48.51 | 62.10 |
| BF | 8.00 | 11.40 | 5.69 |
| d3 | 1.33 | 12.11 | 22.48 |
| d7 | 14.21 | 3.07 | 0.45 |
| d14 | 1.00 | 4.15 | 6.03 |
| d16 | 1.00 | 1.52 | 11.19 |
| d18 | 6.57 | 9.97 | 4.27 |

-continued

Unit: mm

Zoom Lens Unit Data

| Lens unit | Most object side surface | Focal length |
|---|---|---|
| 1 | 1 | 40.45 |
| 2 | 4 | −7.12 |
| 3 | 8 | 10.04 |
| 4 | 15 | −24.26 |
| 5 | 17 | 20.73 |
| 6 | 19 | ∞ |

Fifth Numerical Embodiment

Unit: mm

Surface Data

| Surface No. | r | d | nd | vd |
|---|---|---|---|---|
| 1 | 21.898 | 0.80 | 1.95906 | 17.5 |
| 2 | 18.547 | 3.50 | 1.55332 | 71.7 |
| 3* | −263.839 | (variable) | | |
| 4* | −23.566 | 0.70 | 1.85135 | 40.1 |
| 5* | 4.918 | 2.50 | | |
| 6 | 10.464 | 1.20 | 1.95906 | 17.5 |
| 7 | 22.589 | (variable) | | |
| 8* | 6.926 | 1.20 | 1.58313 | 59.4 |
| 9* | −42.542 | 0.92 | | |
| 10 (aperture stop) | ∞ | 1.48 | | |
| 11 | 10.653 | 0.50 | 1.92286 | 18.9 |
| 12 | 6.149 | 0.54 | | |
| 13 | 2965.009 | 1.20 | 1.60311 | 60.6 |
| 14 | −9.215 | (variable) | | |
| 15 | −65.344 | 0.50 | 1.88300 | 40.8 |
| 16 | 30.514 | (variable) | | |
| 17* | 11.250 | 1.90 | 1.55332 | 71.7 |
| 18 | 458.109 | (variable) | | |
| 19 | ∞ | 0.80 | 1.51633 | 64.1 |
| 20 | ∞ | 0.90 | | |
| Image plane | ∞ | | | |

Aspherical Surface Data

Surface 3

K = −2.31782e+003  A4 = −7.48176e−006  A6 = 1.43382e−007
A8 = −1.14768e−009  A10 = 4.18830e−012
Surface 4

K = −1.27771e+001  A4 = −1.38478e−004  A6 = 1.07097e−005
A8 = −3.77843e−007  A10 = 5.62577e−009
Surface 5

K = −8.23490e−001  A4 = −1.31358e−004  A6 = 2.49428e−005
A8 = −1.61602e−006  A10 = 4.55722e−008
Surface 8

K = −1.16477e+000  A4 = 8.23813e−005  A6 = 2.64768e−005
A8 = 8.50599e−007  A10 = −1.76514e−007
Surface 9

K = −2.58023e+002  A4 = −1.68966e−004  A6 = 6.95357e−005
A8 = −3.70661e−006  A10 = 4.34102e−008
Surface 17

K = −3.12321e−001  A4 = 1.21432e−005  A6 = 1.76279e−006
A8 = −1.06415e−007  A10 = 2.83861e−009

-continued

Unit: mm

Miscellaneous Data
Zoom ratio 11.56

| | Wide-angle | Middle | Telephoto |
|---|---|---|---|
| Focal length | 5.09 | 17.77 | 58.80 |
| F-number | 3.20 | 4.47 | 6.08 |
| Angle of view | 37.73 | 12.33 | 3.69 |
| Image height | 3.33 | 3.88 | 3.88 |
| Total lens length | 43.83 | 50.46 | 65.13 |
| BF | 8.20 | 11.80 | 4.46 |
| d3 | 1.27 | 12.62 | 24.23 |
| d7 | 15.42 | 3.68 | 0.47 |
| d14 | 1.00 | 3.61 | 5.24 |
| d16 | 1.00 | 1.82 | 13.79 |
| d18 | 6.77 | 10.37 | 3.03 |

TABLE 1

| | Numeric embodiment | | | | |
|---|---|---|---|---|---|
| | 1 | 2 | 3 | 4 | 5 |
| Conditional expression (1) | 0.45 | 0.88 | 0.70 | 0.98 | 0.83 |
| Conditional expression (2) | −4.23 | −2.90 | −3.31 | −3.97 | −4.19 |
| Conditional expression (3) | 4.73 | 4.73 | 4.58 | 4.74 | 4.62 |
| Conditional expression (4) | 0.76 | 0.79 | 0.76 | 0.77 | 0.76 |
| Conditional expression (5) | 0.66 | 0.61 | 0.67 | 0.65 | 0.65 |
| Conditional expression (6) | 7.77 | 7.55 | 6.71 | 7.90 | 8.10 |
| Conditional expression (7) | 1.45 | 1.51 | 1.30 | 1.39 | 1.43 |
| Conditional expression (8) | 0.27 | 0.27 | 0.28 | 0.29 | 0.24 |
| Conditional expression (9) | 0.043 | 0.045 | 0.043 | 0.046 | 0.043 |
| Conditional expression (10) | 0.032 | 0.029 | 0.032 | 0.035 | 0.032 |
| Conditional expression (11) | 1.99 | 2.09 | 1.95 | 1.96 | 2.03 |
| Conditional expression (12) | 3.66 | 4.14 | 5.03 | 4.05 | 4.09 |
| Conditional expression (13) | −0.89 | −0.78 | −0.79 | −0.84 | −0.85 |
| Conditional expression (14) | 0.34 | 0.32 | 0.37 | 0.35 | 0.34 |

Next, an embodiment of a digital still camera is described with reference to FIG. 11. The digital still camera uses a zoom lens as described in the embodiments as an image pickup optical system. Referring to FIG. 11, a digital still camera includes a camera main body 20 and an image pickup optical system 25 that includes a zoom lens according to one of the first to fifth embodiments. The digital still camera also includes a solid-state image pickup device 26 (photo electric transducer) such as a charge-coupled device (CCD) sensor or a complementary metal oxide semiconductor (CMOS) sensor. The solid-state image pickup device is disposed inside the camera main body 20 and receives an object image formed by the image pickup optical system 25.

The digital still camera also includes a memory 23 that records information corresponding to the object image, the information having been undergone photoelectric conversion using the solid-state image pickup device 26. The digital still camera also includes a viewfinder 24 that uses a liquid crystal display panel or the like and allows the user to observe the object image formed on the solid-state image pickup device 26.

As described above, by applying the zoom lens according to the present invention to an image pickup apparatus such as a digital still camera, a compact image pickup apparatus exhibiting high optical performance can be realized. The zoom lens according to the present invention can also be applied to a single-lens reflex camera that has no quick-return mirror.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-055741 filed Mar. 13, 2012, which is hereby incorporated by reference herein in its entirety.

What is claimed is:

1. A zoom lens comprising:
a first lens unit that has a positive refractive power;
a second lens unit that has a negative refractive power;
a third lens unit that has a positive refractive power;
a fourth lens unit that has a negative refractive power; and
a fifth lens unit that has a positive refractive power,
wherein the first to fifth lens units are arranged sequentially from an object side to an image side,
wherein, in comparison with a wide-angle end, at a telephoto end, a distance between the first lens unit and the second lens unit is increased, a distance between the second lens unit and the third lens unit is decreased, a distance between the third lens unit and the fourth lens unit is increased, and a distance between the fourth lens unit and the fifth lens unit is increased,
wherein, in comparison with the wide-angle end, at the telephoto end, each lens unit moves so that the first lens unit is positioned closer to the object side,
wherein the first lens unit and the second lens unit each consist of a single positive lens element and a single negative lens element, and
wherein, when the distance between the third lens unit and the fourth lens unit at the wide-angle end is defined as D34$w$, the distance between the third lens unit and the fourth lens unit at the telephoto end is defined as D34$t$, and a focal length of the entire zoom lens at the wide-angle end is defined as fw, the following conditional expression is satisfied:

$0.2<(D34t-D34w)/fw<1.2.$

2. The zoom lens according to claim 1,
wherein, when a moving distance of the first lens unit in zooming from the wide-angle end to the telephoto end is defined as M1, the following conditional expression is satisfied:

$-5.0<M1/fw<-2.0.$

3. The zoom lens according to claim 1,
wherein, when a focal length of the fourth lens unit is defined as f4, the following conditional expression is satisfied:

$3.0<|f4|/fw<6.0.$

4. The zoom lens according to claim 1,
wherein, when a focal length of the positive lens element of the first lens unit is defined as f1$p$ and a focal length of the first lens unit is defined as f1, the following conditional expression is satisfied:

$0.3<f1p/f1<0.9.$

5. The zoom lens according to claim 1,
wherein, when a focal length of the negative lens element of the second lens unit is defined as f2$n$ and a focal length of the second lens unit is defined as f2, the following conditional expression is satisfied:

$0.3<f2n/f2<0.9.$

6. The zoom lens according to claim 1,
wherein, when a focal length of the first lens unit is defined as f1, the following conditional expression is satisfied:

$4.0<f1/fw<10.0.$

7. The zoom lens according to claim 1,
wherein, when a focal length of the second lens unit is defined as f2, the following conditional expression is satisfied:

$0.8<|f2|/fw<2.0.$

8. The zoom lens according to claim 1,
wherein, when lateral magnifications of the third lens unit, the fourth lens unit, and the fifth lens unit at the wide-angle end are respectively defined as β3$w$, β4$w$, and β5$w$, the lateral magnifications of the third lens unit, the fourth lens unit, and the fifth lens unit at the telephoto end are respectively defined as β3$t$, β4$t$, and β5$t$, and the focal length of the entire zoom lens at the telephoto end is defined as ft, the following conditional expression is satisfied:

$0.2<\{(β3t×β4t×β5t)/(β3w×β4w×β5w)\}/(ft/fw)<0.5.$

9. The zoom lens according to claim 1,
wherein, when Abbe numbers of materials of the positive lens element and the negative lens element of the first lens unit are respectively defined as ν1$p$ and ν1$n$, the following conditional expression is satisfied:

$0.03<1/ν1n-1/ν1p<0.05.$

10. The zoom lens according to claim 1,
wherein, when Abbe numbers of materials of the positive lens element and the negative lens element of the second lens unit are respectively defined as ν2$p$ and ν2$n$, the following conditional expression is satisfied:

$0.02<1/ν2p-1/ν2n<0.04.$

11. The zoom lens according to claim 1,
wherein, when a focal length of the third lens unit is defined as f3, the following conditional expression is satisfied:

$1.0<f3/fw<3.0.$

12. The zoom lens according to claim 1,
wherein, when a focal length of the fifth lens unit is defined as f5, the following conditional expression is satisfied:

$3.0<f5/fw<6.0.$

13. The zoom lens according to claim 1,
wherein, when a radius of curvature of a lens surface of the first lens unit, the lens surface being a lens surface closest to the object side, is defined as R1$a$, and a radius of curvature of a lens surface of the first lens unit, the lens surface being a lens surface closest to the image side, is defined as R1$b$, the following conditional expression is satisfied:

$-1.5<(R1a+R1b)/(R1a-R1b)<-0.5.$

14. The zoom lens according to claim 1,
wherein the negative lens element and the positive lens element of the second lens unit are arranged in this order from the object side to the image side, and
wherein, when a distance between the positive lens element and the negative lens element of the second lens unit is defined as L, and a focal length of the second lens unit is defined as f2, the following conditional expression is satisfied:

$$0.2 < L/|f2| < 0.5.$$

15. An image pickup apparatus comprising:
the zoom lens according to claim 1; and
a solid-state image pickup device that receives an image formed by the zoom lens.

\* \* \* \* \*